(12) United States Patent
Yumiki et al.

(10) Patent No.: US 8,824,069 B2
(45) Date of Patent: *Sep. 2, 2014

(54) LENS BARREL

(75) Inventors: Naoto Yumiki, Osaka (JP); Hideo Onishi, Osaka (JP); Yoshiharu Araki, Osaka (JP); Fumio Muramatsu, Kyoto (JP)

(73) Assignee: Panasonic Corporation, Osaka (JP)

( * ) Notice: Subject to any disclaimer, the term of this patent is extended or adjusted under 35 U.S.C. 154(b) by 895 days.

This patent is subject to a terminal disclaimer.

(21) Appl. No.: 13/010,932

(22) Filed: Jan. 21, 2011

(65) Prior Publication Data

US 2011/0116176 A1 May 19, 2011

Related U.S. Application Data

(62) Division of application No. 12/547,588, filed on Aug. 26, 2009, now Pat. No. 8,049,979.

(30) Foreign Application Priority Data

Sep. 8, 2008 (JP) .................................. 2008-230163

(51) Int. Cl.
*G02B 7/02* (2006.01)
*G02B 7/10* (2006.01)
*G02B 15/173* (2006.01)
*H04N 5/232* (2006.01)

(52) U.S. Cl.
CPC .............. *G02B 15/173* (2013.01); *G02B 7/102* (2013.01); *H04N 5/23212* (2013.01); *H04N 5/23209* (2013.01); *H04N 5/23296* (2013.01)
USPC .......................................... 359/824; 359/826

(58) Field of Classification Search
USPC .......................... 359/823, 824, 826, 827, 829
See application file for complete search history.

(56) References Cited

U.S. PATENT DOCUMENTS

| | | | |
|---|---|---|---|
| 6,091,900 A | 7/2000 | Kaneda et al. | |
| 7,477,454 B2 | 1/2009 | Shinohara et al. | |
| 8,049,979 B2 | 11/2011 | Yumiki et al. | |
| 8,259,404 B2 * | 9/2012 | Yumiki et al. | ................. 359/824 |
| 2005/0134976 A1 | 6/2005 | Yano | |

(Continued)

FOREIGN PATENT DOCUMENTS

| | | | |
|---|---|---|---|
| JP | 08-036125 A | 2/1996 |
| JP | 10-293237 A | 11/1998 |
| JP | 2000-187146 | 7/2000 |
| JP | 2001-066487 A | 3/2001 |
| JP | 2002-156573 A | 5/2002 |

(Continued)

*Primary Examiner* — William Choi
(74) *Attorney, Agent, or Firm* — Panasonic Patent Center

(57) ABSTRACT

The lens barrel includes a first lens unit, a second lens unit, and a drive unit. The first lens unit includes a first lens element and a first lens support frame supporting the first lens element. The second lens unit includes a second lens element and a second lens support frame supporting the second lens element. The second lens unit is supported by the first lens unit to be movable in the optical axis direction of the first lens element with respect to the first lens unit. The drive unit is arranged to be used to drive the second lens unit with respect to the first lens unit, and is fixed to the first lens unit. When viewed in the optical axis direction, the drive unit is fixed to the first lens unit so that a first profile line formed by the first lens unit and the drive unit is substantially circular.

1 Claim, 18 Drawing Sheets

(56) References Cited

U.S. PATENT DOCUMENTS

| | | |
|---|---|---|
| 2005/0219719 A1 | 10/2005 | Kawai |
| 2006/0083505 A1 | 4/2006 | Kashiwaba |
| 2011/0242404 A1 | 10/2011 | Yumiki et al. |
| 2011/0242405 A1 | 10/2011 | Yumiki et al. |
| 2011/0242406 A1 | 10/2011 | Yumiki et al. |
| 2011/0254996 A1 | 10/2011 | Yumiki et al. |
| 2011/0254997 A1 | 10/2011 | Yumiki et al. |

FOREIGN PATENT DOCUMENTS

| | | |
|---|---|---|
| JP | 2003-084182 | 3/2003 |
| JP | 2003-287670 | 10/2003 |
| JP | 2005-316394 A | 11/2005 |
| JP | 2006-113289 A | 4/2006 |
| JP | 2006-235020 A | 9/2006 |
| JP | 2007-079206 | 3/2007 |
| JP | 2007-206451 A | 8/2007 |

* cited by examiner

LENS BARREL

CROSS-REFERENCE TO RELATED APPLICATIONS

This application claims priority to Japanese Patent Application No. 2008-230163 filed on Sep. 8, 2008. The entire disclosure of Japanese Patent Application No. 2008-230163 is hereby incorporated herein by reference.

BACKGROUND

1. Technical Field

The technical field relates to a lens barrel with which the focal length can be changed.

2. Description of the Related Art

Conventional digital cameras make use of a zoom lens system with which the focal length can be varied while the object distance of a subject that is in focus (hereinafter also referred to as the subject distance) is kept substantially constant. For example, zoom lens systems are employed in compact digital cameras and digital cameras with interchangeable lenses.

With a conventional lens barrel, for example, as the zoom mechanism operates, the focus lens unit including the focus lens is moved in the optical axis direction by a cam mechanism. This allows the focal length to be varied while the subject distance is kept substantially constant (see, for example, Japanese Laid-Open Patent Application 2006-113289).

A phase difference detection system has been employed as the auto-focus system with conventional interchangeable lens digital cameras.

More recently, however, an interchangeable lens digital camera has been proposed that makes use of a contrast detection system for auto-focusing. With this contrast detection system, for example, the focus lens unit is moved in the optical axis direction while evaluation values at various positions of the focus lens unit are found on the basis of image data. The focus lens unit is moved until the evaluation value goes past its peak, after which the evaluation value is returned to its maximum position to focus the subject image (an optical image of the subject). Thus, in auto-focusing by contrast detection, it is necessary to move the focus lens unit back and forth in the optical axis direction.

Also, since the focus needs to be continued during the capture of moving pictures, the focus lens unit has to be continuously moved back and forth and the peak of the evaluation value detected.

Thus, when a contrast detection system is used, since the focus lens unit is moved in the optical axis direction, making the focus lens unit smaller is preferable when drive speed is taken into account.

SUMMARY

However, if a configuration is employed in which the focus lens unit is driven in the optical axis direction by a cam mechanism, as with the lens barrel described in Japanese Laid-Open Patent Application 2006-113289, the size of the focus lens unit becomes larger, or the weight of the focus lens unit increases.

In view of this, the inventors of the present invention studied a lens barrel with which drive of the zoom mechanism is performed only by manual operation by the user, and drive of the focus lens unit with respect to the zoom mechanism is performed only by actuator. In this case, the structure of the focus lens unit and its surrounding parts is simplified, so the focus lens unit can be made more compact.

However, if a motor is used as the actuator that drives the focus lens, when the motor is attached to the lens barrel, the motor sticks out considerably to the outside of the lens barrel, and this hampers the effort to make the lens barrel more compact.

The lens barrel according to a first aspect comprises a first lens unit, a second lens unit, and a drive unit. The first lens unit includes a first lens element and a first lens support frame supporting the first lens element. The second lens unit includes a second lens element and a second lens support frame supporting the second lens element. The second lens unit is supported by the first lens unit to be movable in the optical axis direction of the first lens element with respect to the first lens unit. The drive unit is arranged to be used to drive the second lens unit with respect to the first lens unit, and is fixed to the first lens unit. When viewed in the optical axis direction, the drive unit is fixed to the first lens unit so that a first profile line formed by the first lens unit and the drive unit is substantially circular.

With this lens barrel, when viewed in the optical axis direction, the drive unit is fixed to the first lens unit so that a first profile line formed by the first lens unit and the drive unit is substantially circular, so the drive unit does not stick as far outside from the first lens unit. This allows the lens barrel to be more compact. Also, a reduction in size is possible with an imaging device equipped with this lens barrel.

The phrase "a first profile line is substantially circular" here includes not only a case in which the first profile line formed by the first lens unit and the drive unit is completely circular, but also a case in which the first profile line deviates from being circular to the extent that the lens barrel size can still be reduced.

In determining whether or not the first profile line is substantially circular, even if a portion that sticks out to the outside, such as a cam pin, is provided to the first lens unit, the shape of that portion is not taken into account.

The lens barrel according to a second aspect comprises a first lens unit, a second lens unit, and a drive unit. The first lens unit includes a first lens element and a first lens support frame supporting the first lens element. The second lens unit includes a second lens element and a second lens support frame supporting the second lens element. The second lens unit is supported by the first lens unit to be movable in the optical axis direction of the first lens element with respect to the first lens unit. The drive unit is arranged to be used to drive the second lens unit with respect to the first lens unit, and is fixed to the first lens unit. The second lens unit includes a transmission member supported rotatably around a second rotational axis by the second lens support frame and arranged to convert the rotary motion of the drive shaft into linear motion in the optical axis direction, and an elastic member imparting rotational force around the second rotational axis to the transmission member so that the transmission member moves to the outer peripheral side with respect to the second lens support frame. The transmission member includes a transmission member body having an approximate U shape that opens on the opposite side from the second rotational axis, and arranged to transmit drive force from the drive unit. The transmission member body opens toward the approximate circumferential direction in a state in which the drive unit is fixed to the first lens unit.

The lens barrel here also encompasses an interchangeable lens unit that is used in an interchangeable lens type of imaging device, in addition to a lens barrel that is integrated with a camera body. The imaging device also encompasses an interchangeable lens type of imaging device, in addition to an imaging device in which the camera body and the lens barrel are integrated. Examples of possible imaging devices include digital still cameras, interchangeable lens digital cameras, digital video cameras, portable telephones with a camera function, and PDAs (Personal Digital Assistants) with a camera function. The imaging device encompasses devices capable of capturing only still pictures, devices capable of capturing only moving pictures, and devices capable of capturing still pictures and moving pictures.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Summary of Digital Camera

Figure 1:
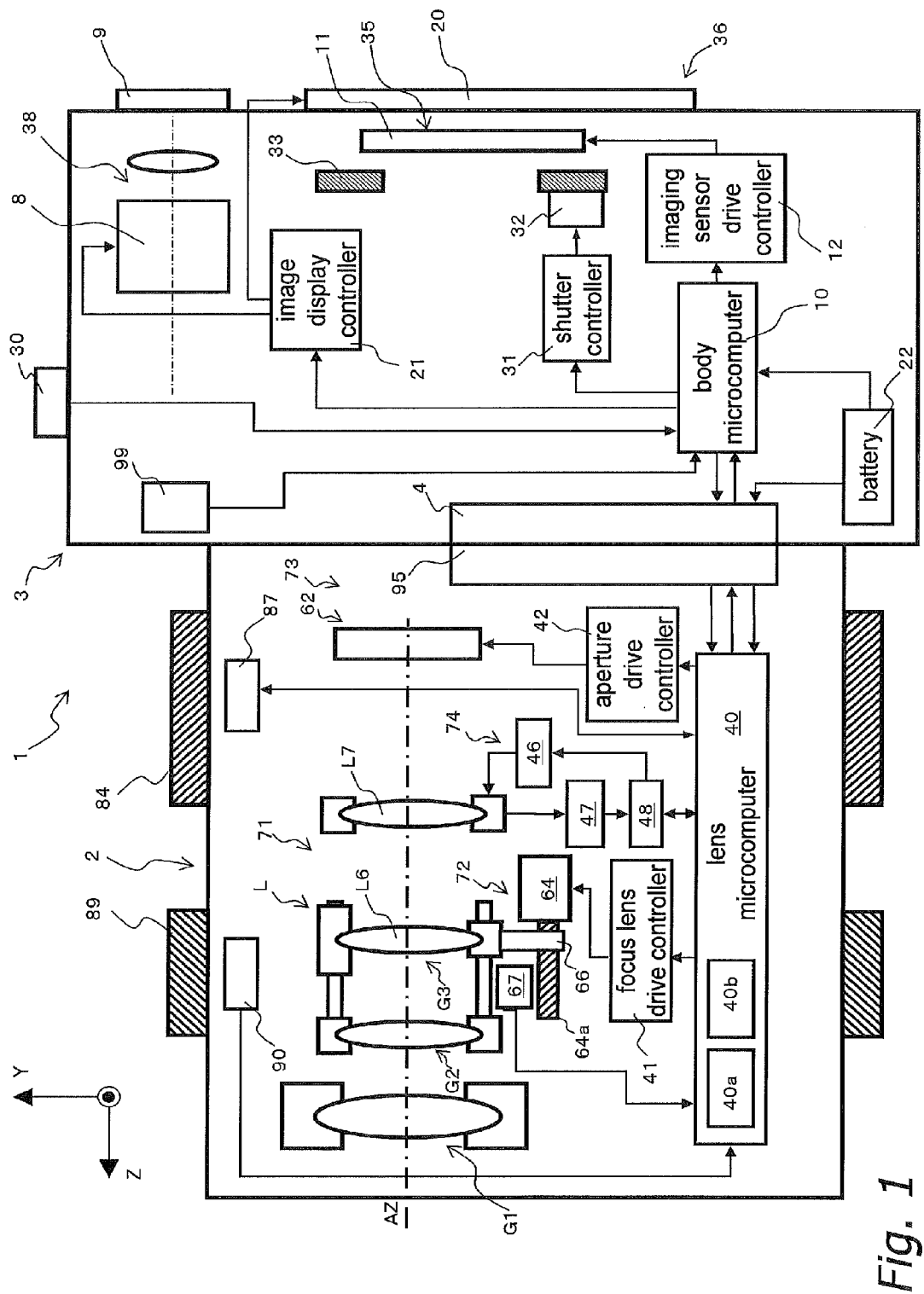
FIG. 1 is a simplified diagram of a digital camera.

A digital camera 1 will be described through reference to FIGS. 1 to 14. FIG. 1 is a simplified diagram of the digital camera 1. As shown in FIG. 1, the digital camera 1 (an example of the imaging device) is a digital camera with an interchangeable lens, and mainly comprises a camera body 3 and an interchangeable lens unit 2 (an example of the lens barrel) that is removably mounted to the camera body 3. The interchangeable lens unit 2 is mounted via a lens mount 95 to a body mount 4 provided to the front face of the camera body 3.

Figure 2:
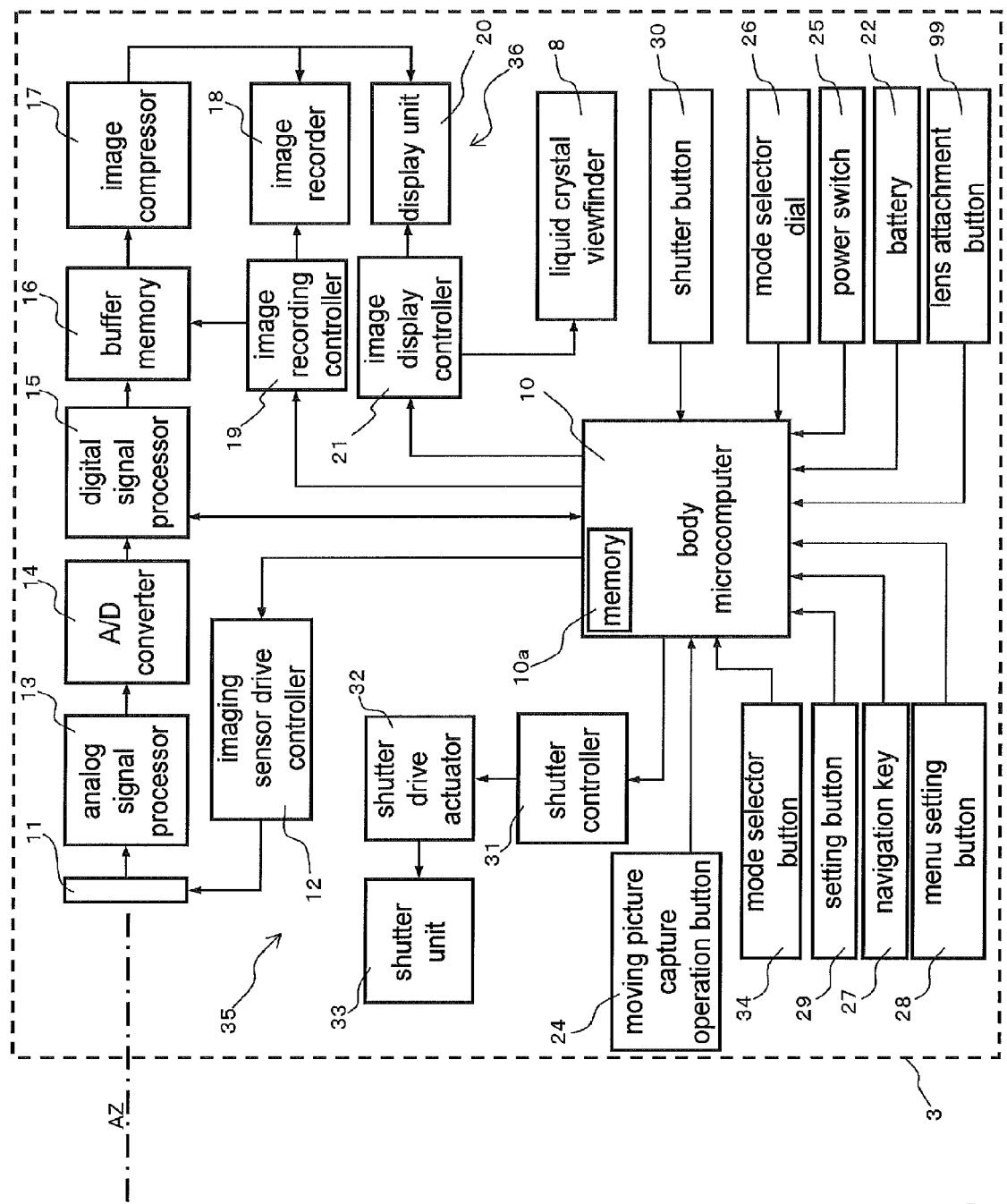
FIG. 2 is a block diagram of the configuration of a camera body.
Figure 3:
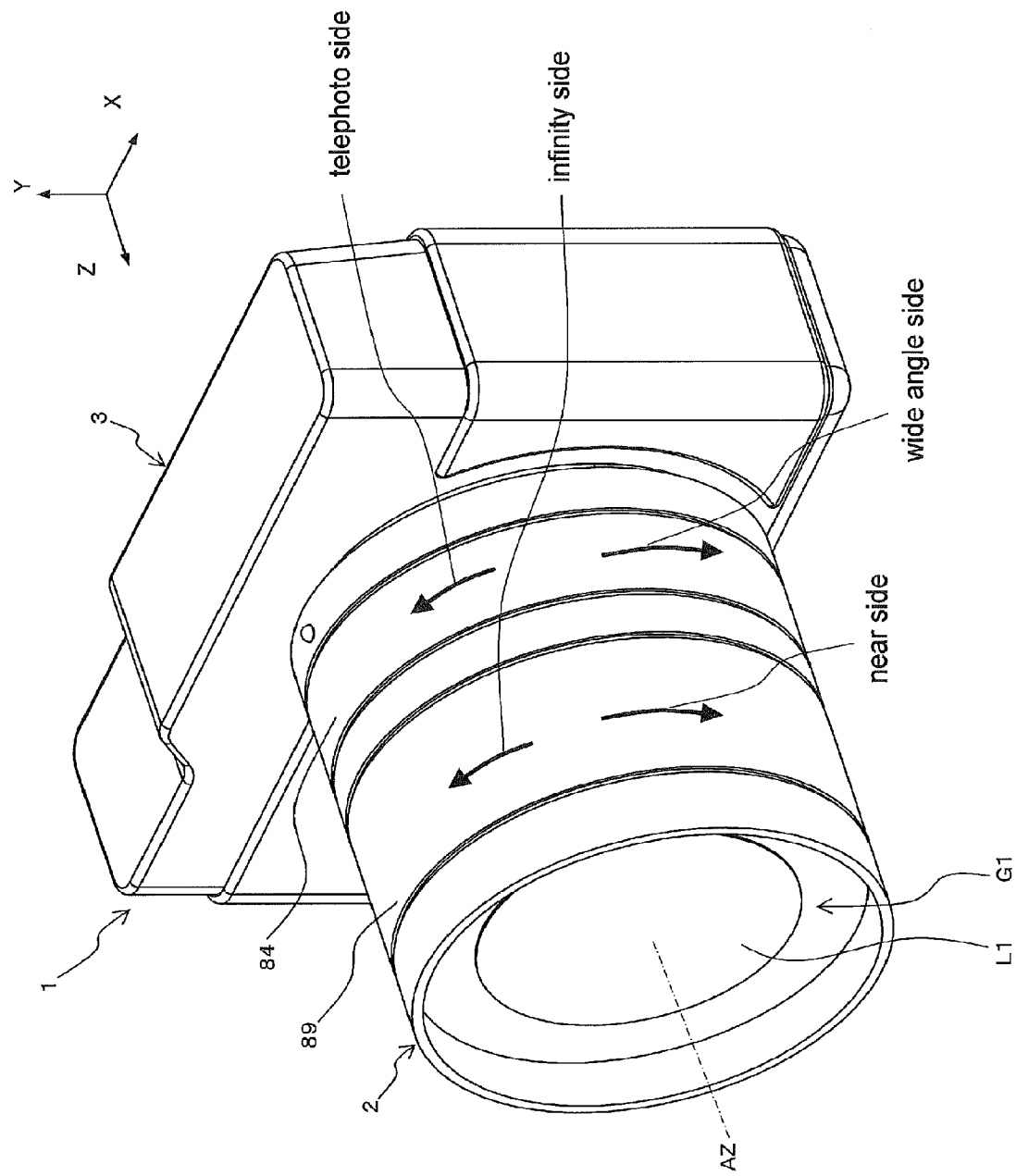
FIG. 3 is a simplified oblique view of a digital camera.
Figure 4A:
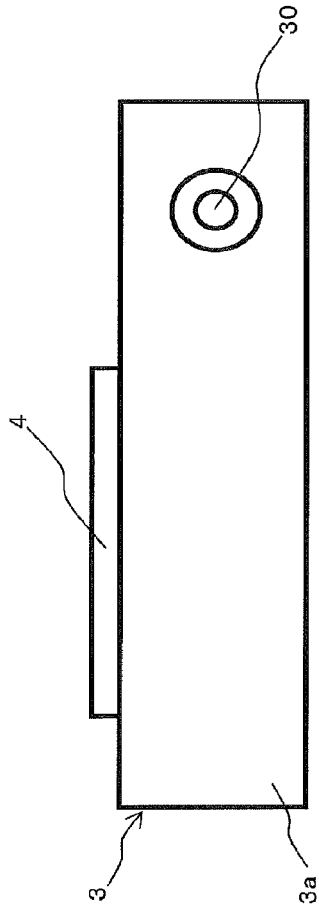
FIG. 4A is a top view of a camera body.
Figure 4B:
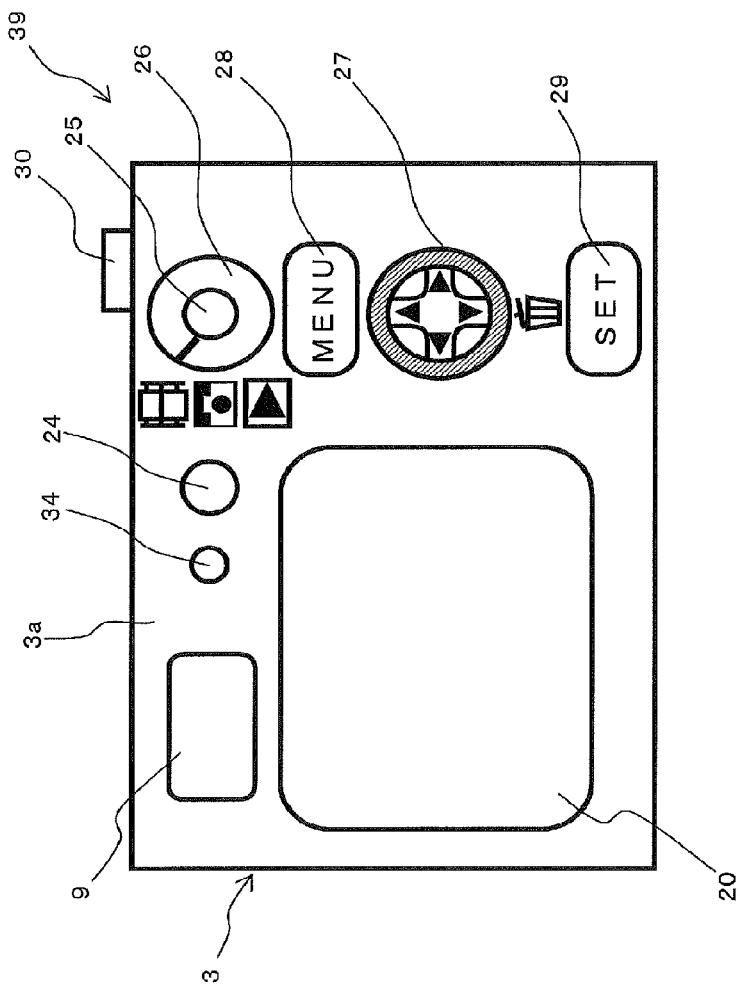
FIG. 4B is a rear view of a camera body.
Figure 5:
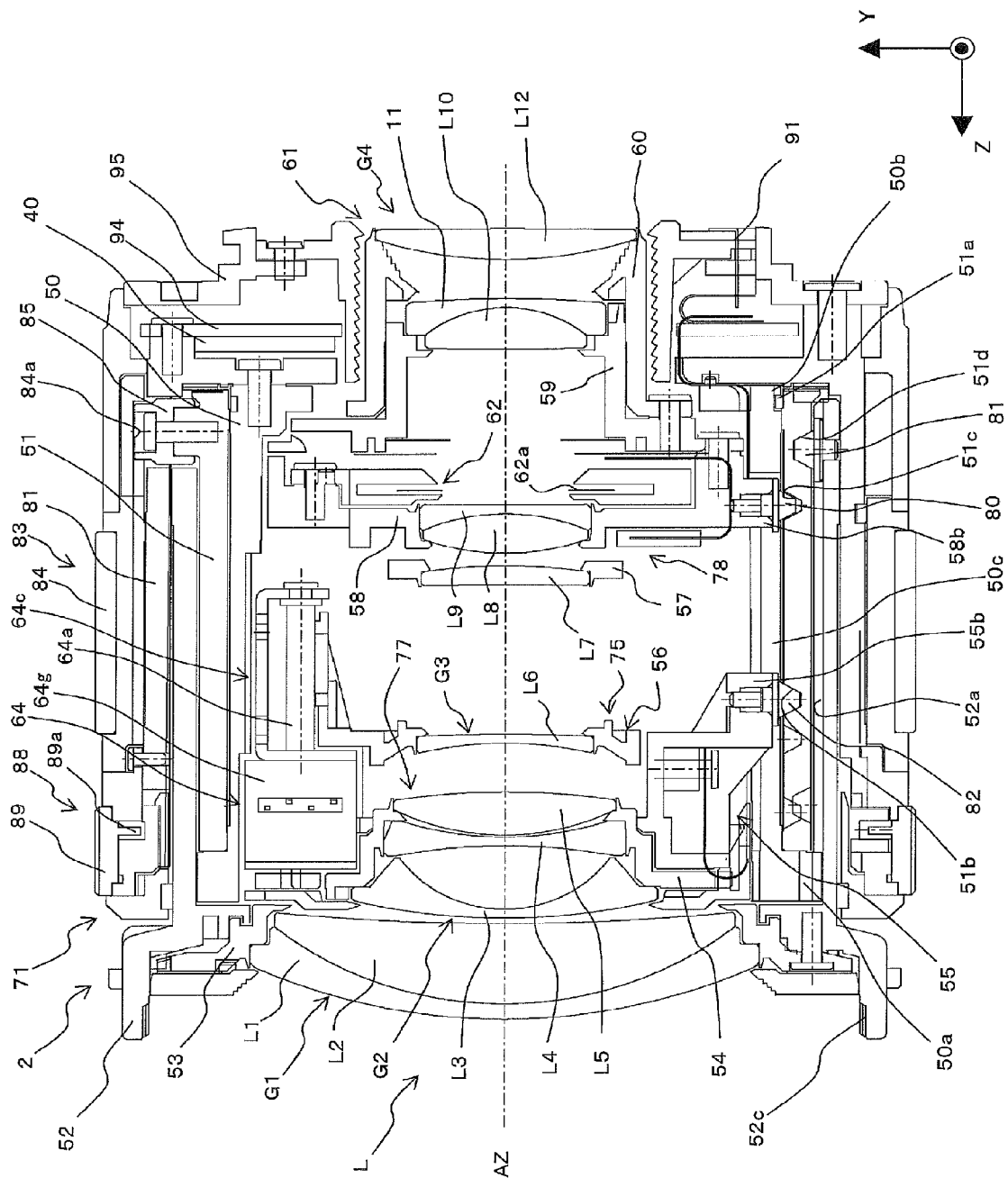
FIG. 5 is a cross section of an interchangeable lens unit (wide angle end)
Figure 6:
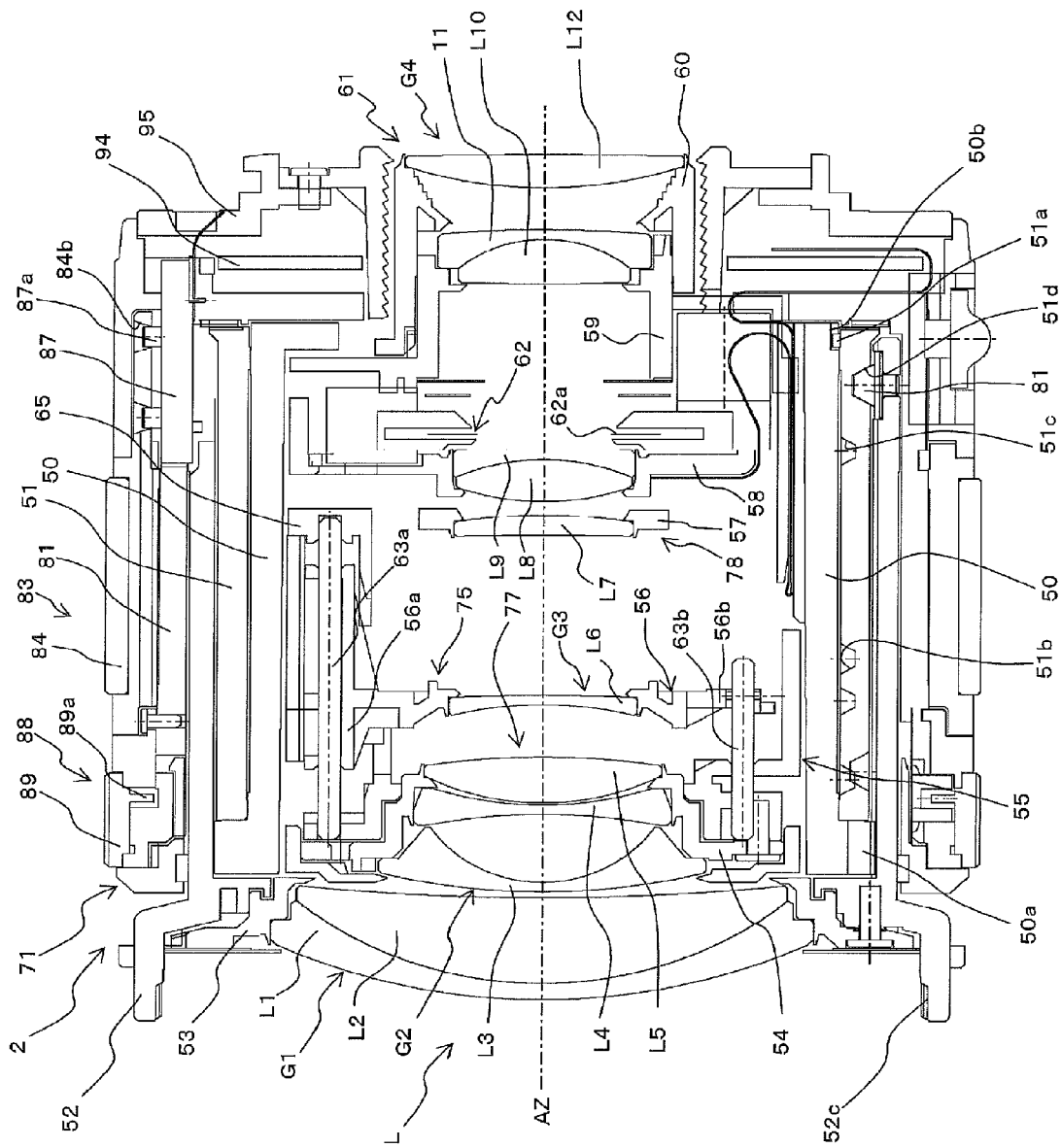
FIG. 6 is a cross section of an interchangeable lens unit (wide angle end)
Figure 7:
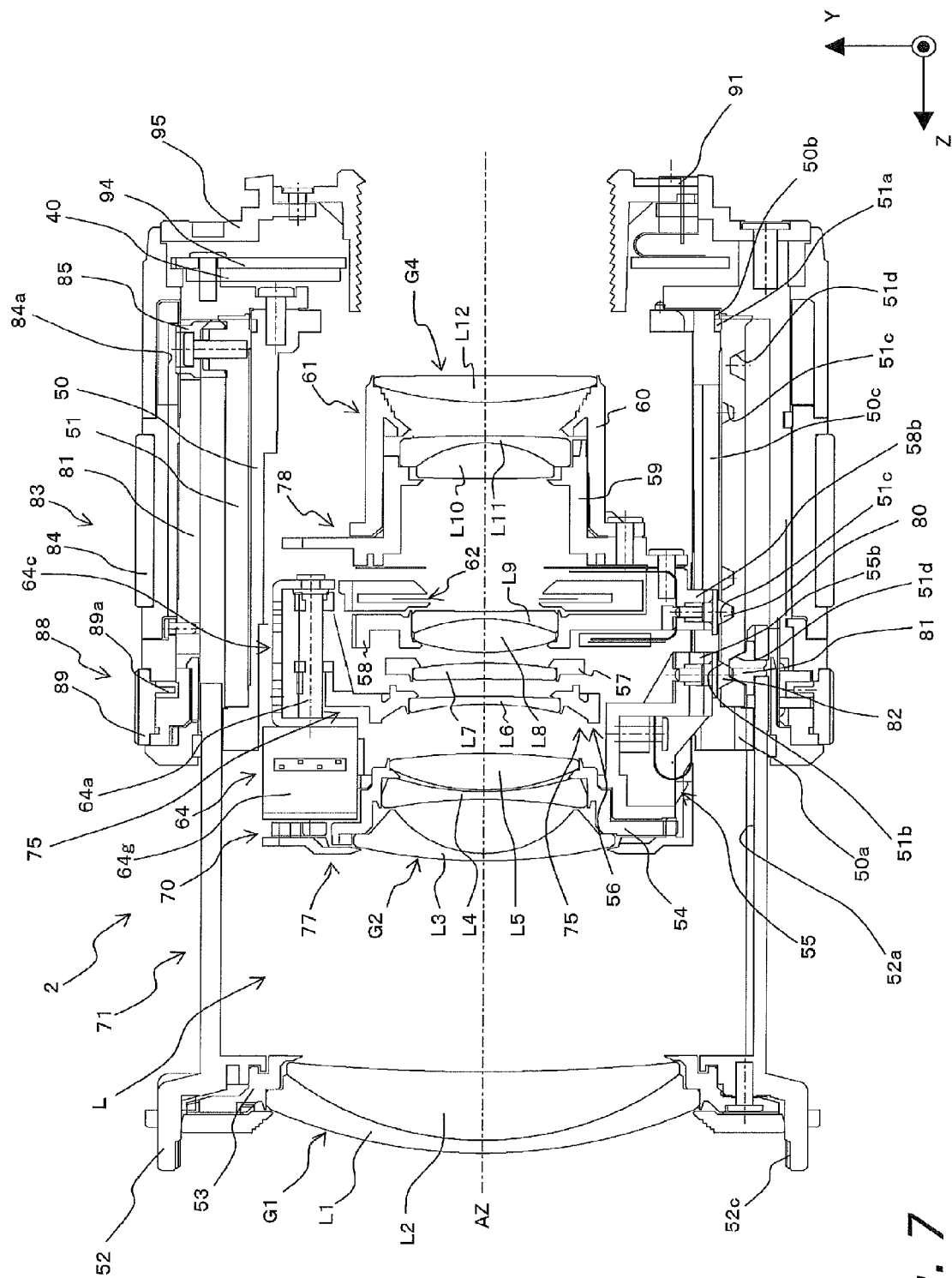
FIG. 7 is a cross section of an interchangeable lens unit (telephoto end)
Figure 8:
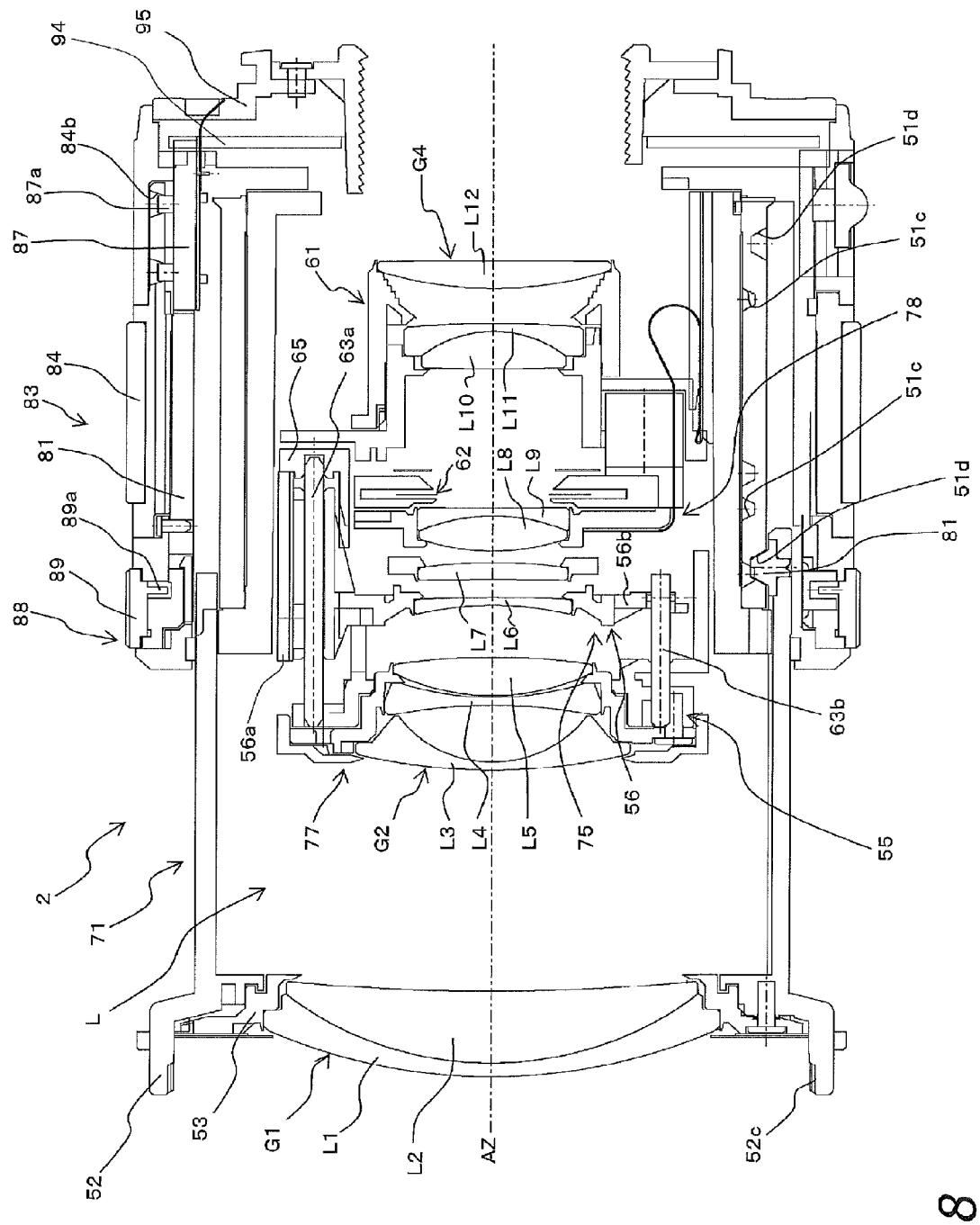
FIG. 8 is a cross section of an interchangeable lens unit (telephoto end)
Figure 9:
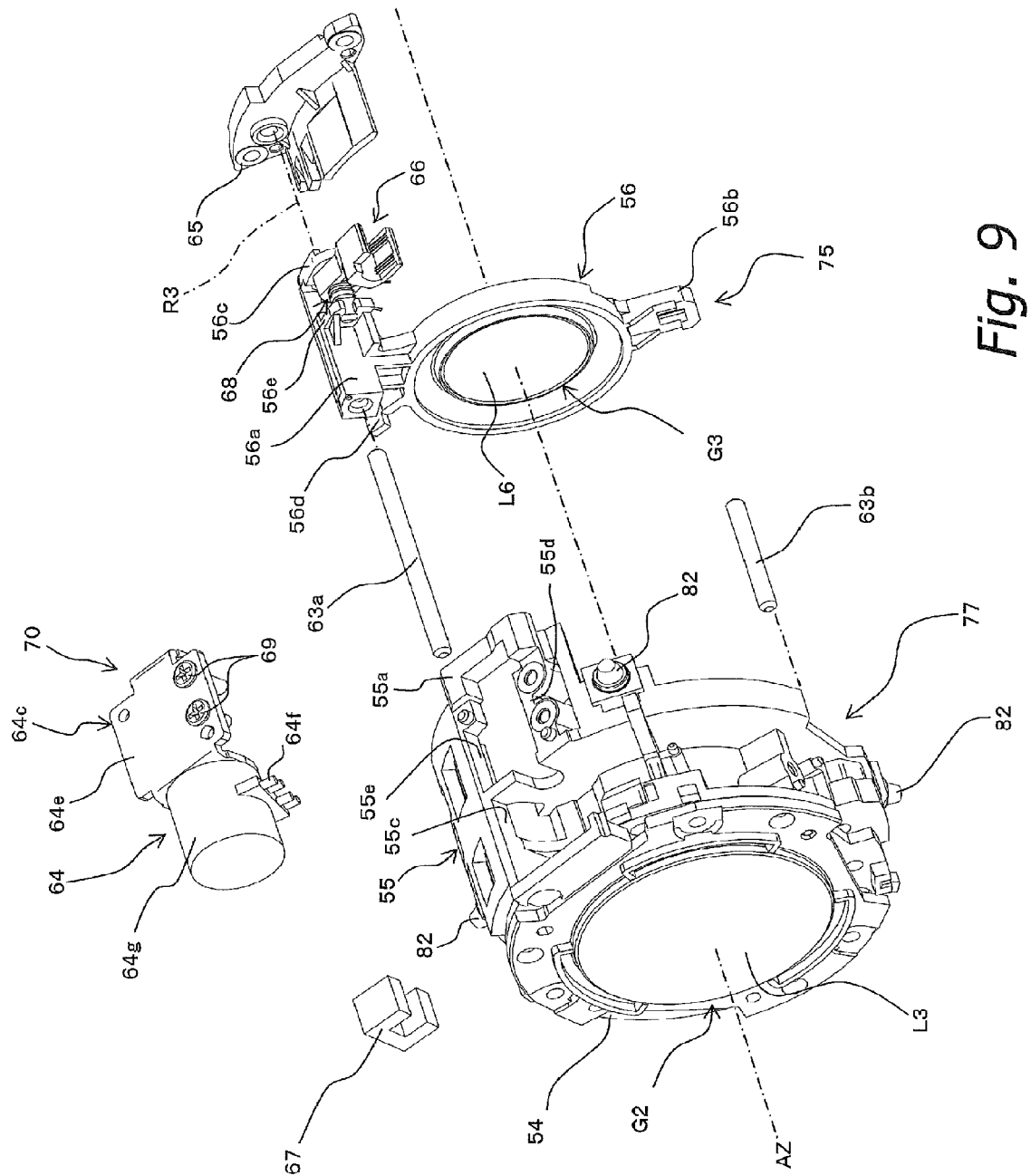
FIG. 9 is an exploded oblique view of a second lens group unit and a focus lens unit.
Figure 10:
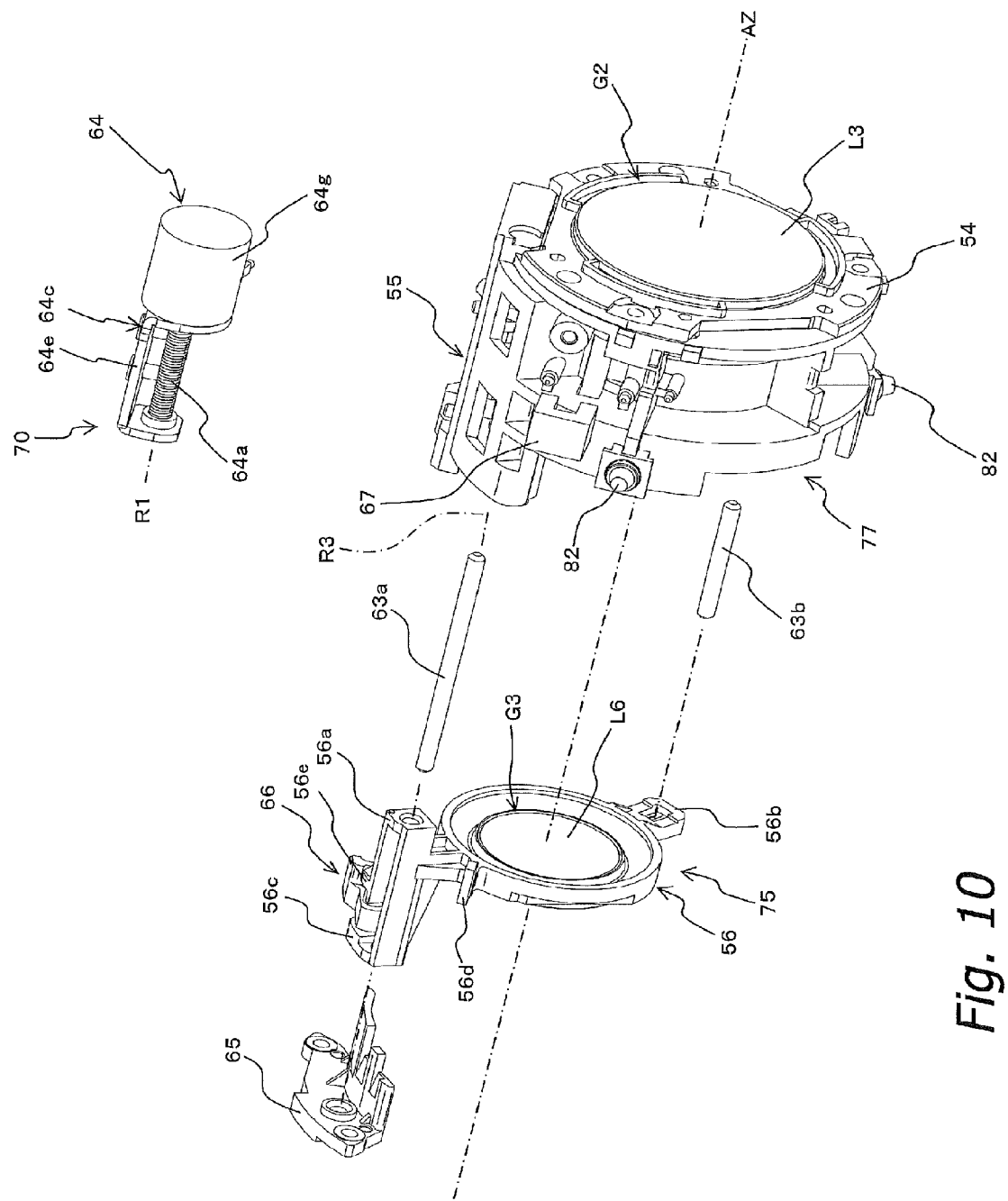
FIG. 10 is an exploded oblique view of a second lens group unit and a focus lens unit.
Figure 11:
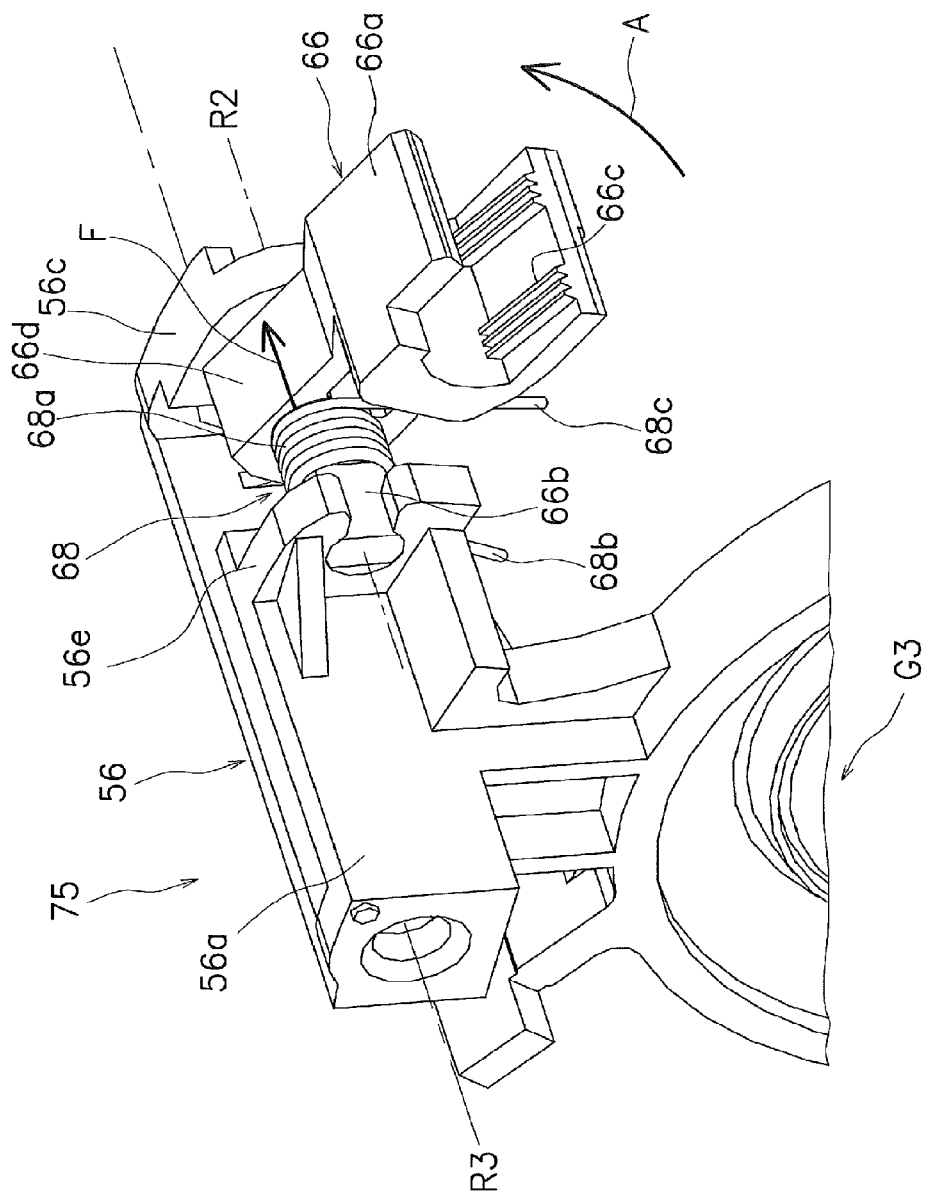
FIG. 11 is an oblique view of the focus lens unit.
Figure 12:
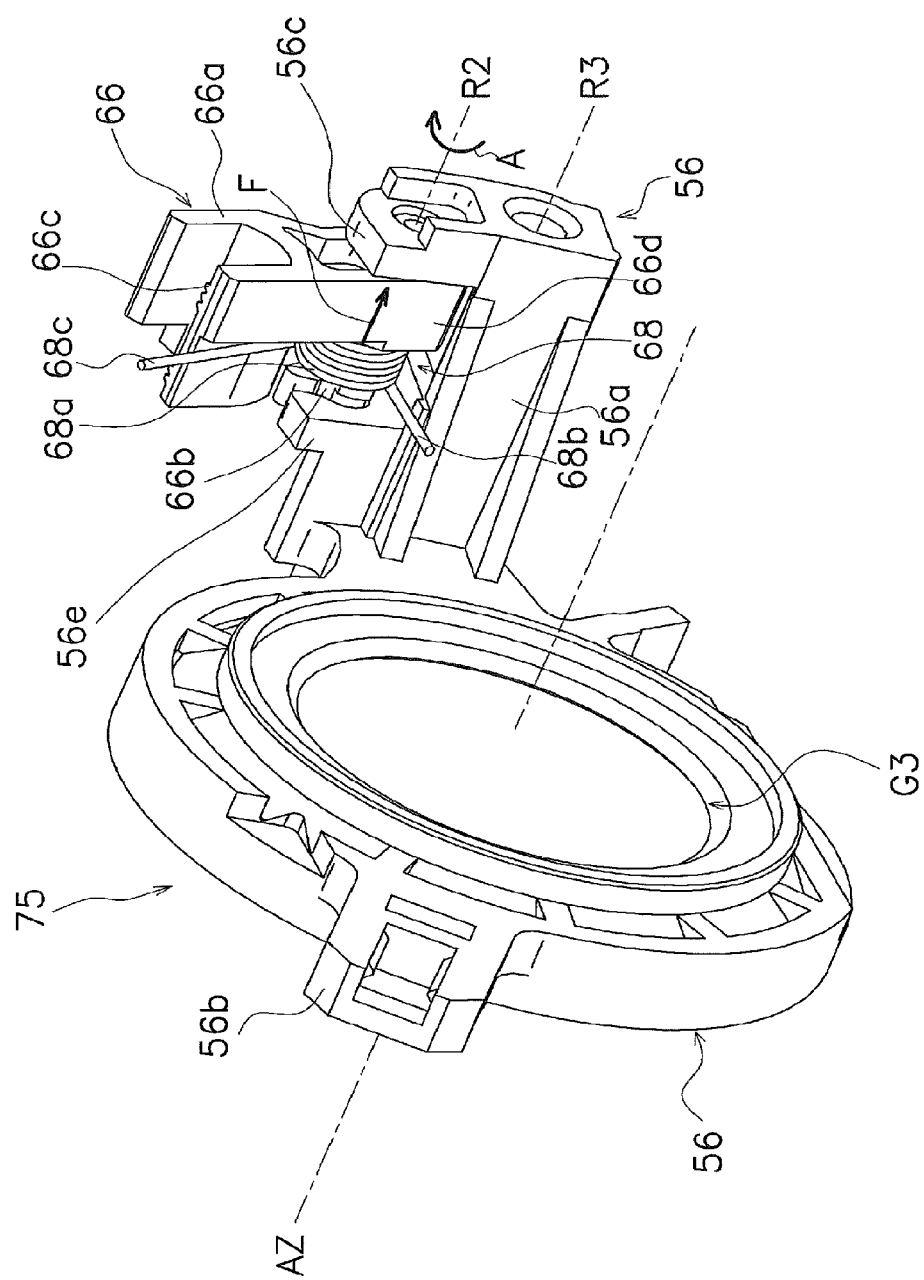
FIG. 12 is an oblique view of the focus lens unit.
Figure 13A:
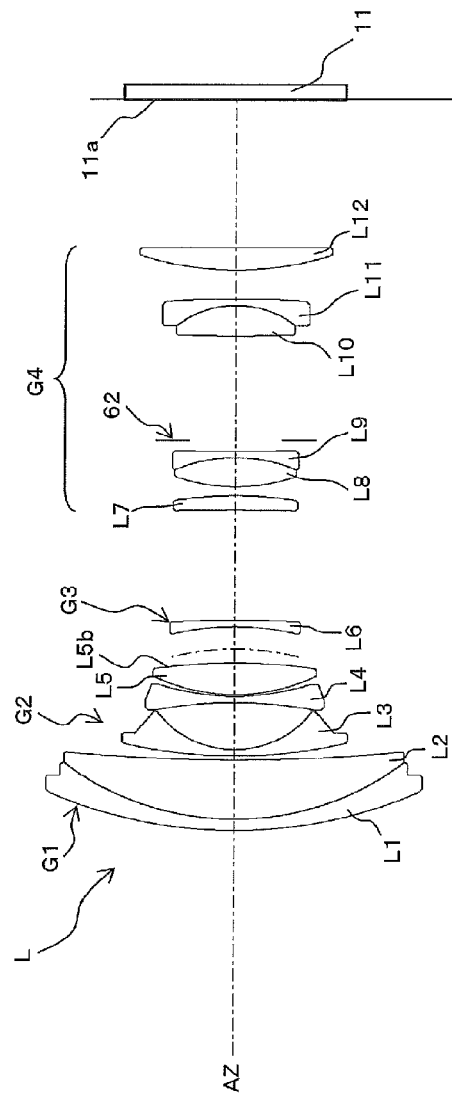
FIG. 13A is a diagram of the configuration of the optical system at the wide angle end.
Figure 13B:
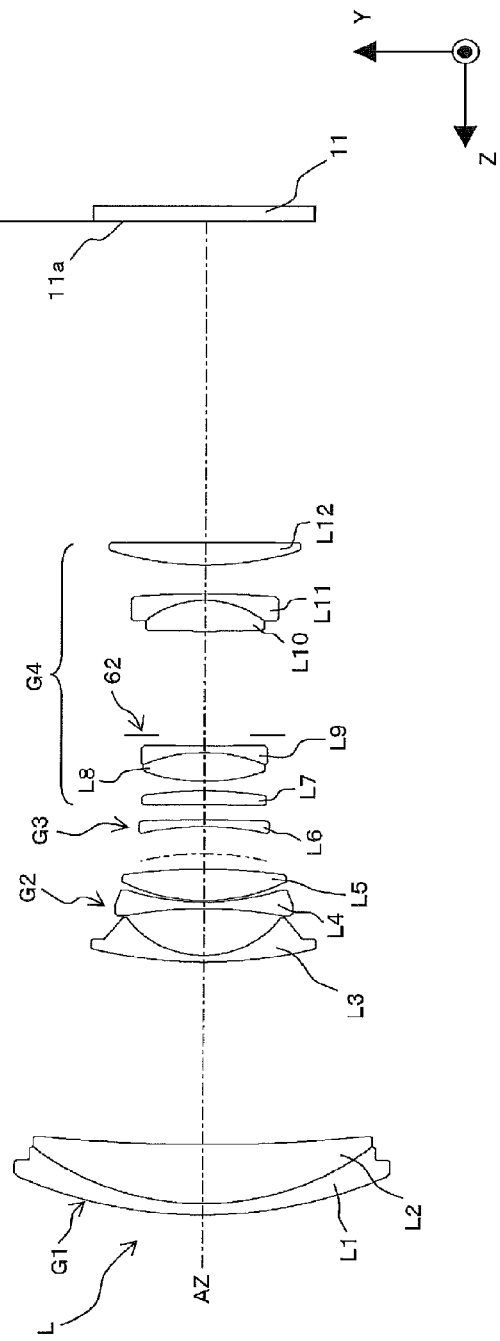
FIG. 13B is a diagram of the configuration of the optical system at the telephoto end.
Figure 14:
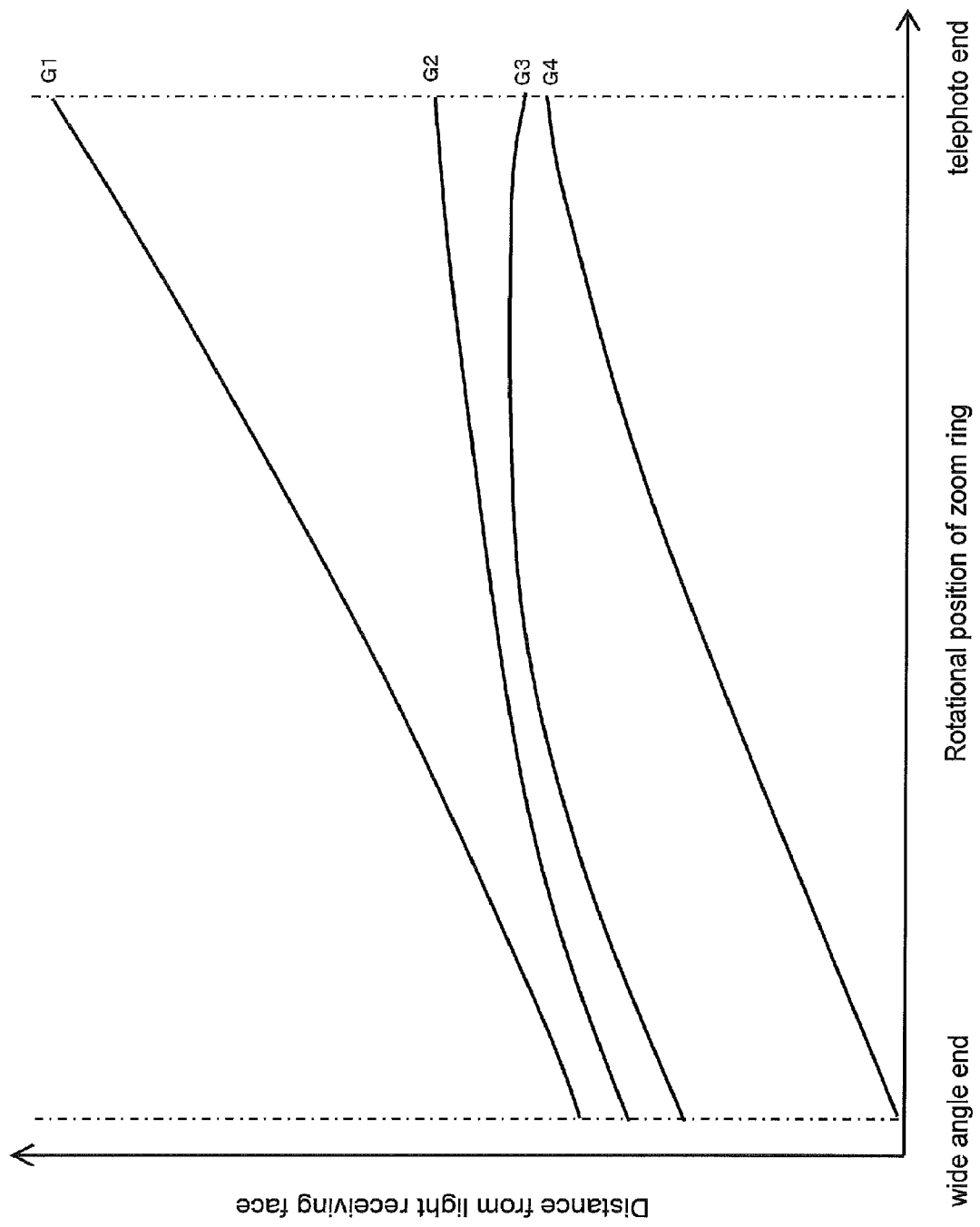
FIG. 14 is a graph of the relationship between the rotational angle of the zoom ring and the distance of the various members from the imaging sensor.

FIG. 2 is a block diagram of the configuration of the camera body 3. FIG. 3 is a simplified oblique view of the digital camera 1. FIG. 4A is a top view of the camera body 3, and FIG. 4B is a rear view of the camera body 3. FIGS. 5 to 8 are simplified cross sections of the interchangeable lens unit 2. FIGS. 5 and 6 show the state at the wide angle end, and FIGS. 7 and 8 show the state at the telephoto end. FIG. 6 is a cross section in a different plane from that of FIG. 5. FIG. 8 is a cross section in a different plane from that of FIG. 7. FIGS. 9 and 10 are exploded oblique views of a second lens group unit 77 and a focus lens unit 75. FIGS. 11 and 12 are oblique views of the focus lens unit. FIGS. 13A and 13B are diagrams of the configuration of an optical system L. FIG. 13A shows the state at the wide angle end, and FIG. 13B shows the state at the telephoto end. FIG. 14 is a graph of the relationship between the rotational position of a zoom ring 84 and the distance of the various members from an imaging sensor 11.

In this embodiment, a three-dimensionally perpendicular coordinate system is set with respect to the digital camera 1. The optical axis AZ of the optical system L (discussed below) coincides with the Z axis direction (an example of the optical axis direction). The X axis direction coincides with the horizontal direction when the digital camera 1 is in its portrait orientation, and the Y axis direction coincides with the vertical direction when the digital camera 1 is in its landscape orientation. In the following description, "front" means on the subject side of the digital camera 1 (the Z axis positive direction side), and "rear" means the opposite side from the subject side of the digital camera 1 (the user side, or the Z axis direction negative side).

Interchangeable Lens Unit

The basic configuration of the interchangeable lens unit 2 will be described through reference to FIGS. 1 to 14. As shown in FIG. 1, the interchangeable lens unit 2 has the optical system L, a lens support mechanism 71 that supports the optical system L, a focus adjusting unit 72, an aperture adjusting unit 73, a blur correction unit 74, and a lens microcomputer 40 (an example of the drive controller).

(1) Optical System

The optical system L is a zoom lens system for forming an optical image of a subject, and is mainly made up of four lens groups. More specifically, as shown in FIGS. 13A and 13B, the optical system L has a first lens group G1 having a positive refractive power, a second lens group G2 having a negative refractive power, a third lens group G3 having a negative refractive power, and a fourth lens group G4 having a positive refractive power.

The first lens group G1 has a first lens L1 and a second lens L2 disposed on the imaging sensor 11 side of the first lens L1. The first lens L1 is a negative meniscus lens having a convex face that faces the subject side. The second lens L2 is a positive meniscus lens having a convex face that faces the subject side, and is joined to the first lens L1 via an adhesive layer.

The second lens group G2 has a third lens L3, a fourth lens L4 disposed on the imaging sensor 11 side of the third lens L3, and a fifth lens L5 (an example of the first lens element) disposed on the imaging sensor 11 side of the fourth lens L4. The third lens L3 is a negative meniscus lens having a convex face that faces the subject side. The fourth lens L4 is a biconcave lens. The fifth lens L5 is a biconvex lens.

The third lens group G3 is made up of a sixth lens L6 (an example of the second lens element). The sixth lens L6 is a negative meniscus lens having a convex face that faces the imaging sensor 11 side, and is disposed in the Z axis direction between the fifth lens L5 and a seventh lens L7 (in the Z axis direction between the second lens group G2 and the fourth lens group G4).

The fourth lens group G4 has the seventh lens L7 (an example of the second lens element), an eighth lens L8, a ninth lens L9, a tenth lens L10, an eleventh lens L11, and a twelfth lens L12. The seventh lens L7 is a positive meniscus lens for blur correction, and has a convex face that faces the imaging sensor 11 side. The eighth lens L8 is a biconvex lens. The ninth lens L9 is a biconcave lens, and is joined to the eighth lens L8 via an adhesive layer. The tenth lens L10 is a biconvex lens. The face of the tenth lens L10 on the subject side is aspherical. The eleventh lens L11 is a negative meniscus lens having a convex face that faces the subject side, and is joined to the tenth lens L10 via an adhesive layer. The twelfth lens L12 is a biconvex lens.

As shown in FIGS. 13A, 13B, and 14, when zooming in from the wide angle end to the telephoto end, the first lens group G1 to fourth lens group G4 each move in the Z axis direction along the optical axis AZ toward the subject side. More precisely, when zooming in from the wide angle end to the telephoto end, the space between the first lens group G1 and the second lens group G2 increases, the space between the second lens group G2 and the third lens group G3 increases, and the space between the third lens group G3 and the fourth lens group G4 decreases. An aperture unit 62 (discussed below) moves to the subject side along with the fourth lens group G4.

When focusing from an infinity focal state to a close focal state, the third lens group G3 moves along the optical axis AZ to the subject side.

Furthermore, the seventh lens L7 moves in two directions perpendicular to the optical axis AZ in order to suppress blurring in the optical image attributable to movement of the digital camera 1.

(2) Lens Support Mechanism

The lens support mechanism 71 is for movably supporting the optical system L, and has the lens mount 95, a fixed frame 50, a cam barrel 51, a first holder 52, a first lens group support frame 53, a second lens group support frame 54 (an example of the support frame), a second holder 55 (an example of the first lens support frame), a third lens group support frame 56 (an example of the second lens support frame), a fourth lens group support frame 61, a zoom ring unit 83 (an example of the zoom mechanism), and a focus ring unit 88.

The lens mount 95 is the portion of the camera body 3 that is mounted to the body mount 4, and has a lens-side contact 91. The fixed frame 50 is a member that rotatably supports the cam barrel 51, and is fixed to the lens mount 95. The fixed frame 50 has a protrusion 50a at the end on the Z axis direction positive side, three concave portions 50b provided to the outer periphery, and three linear through-grooves 50c disposed at an equal pitch around the optical axis AZ. The cam barrel 51 has three convex portions 51a provided to the inner periphery, three first cam grooves 51d, three second cam grooves 51b, and three third cam grooves 51c. Since the convex portions 51a of the cam barrel 51 are inserted into the concave portions 50b of the fixed frame 50, in a state in which relative movement is restricted in the Z axis direction, the cam barrel 51 is supported by the fixed frame 50 to be rotatable with respect to the fixed frame 50.

The first lens group support frame 53 is fixed to the first holder 52 and supports the first lens group G1. The first holder 52 has a longitudinal groove 52a that is formed on the inner peripheral side and extends in the Z axis direction, and three cam pins 81 that are disposed at a constant pitch around the optical axis AZ. The protrusion 50a of the fixed frame 50 is inserted in the longitudinal groove 52a. The cam pins 81 are inserted in the first cam grooves 51d of the cam barrel 51. This configuration allows the first holder 52 to move in the Z axis direction without rotating with respect to the fixed frame 50. The amount of movement of the first holder 52 with respect to the fixed frame 50 is determined by the shape of the first cam grooves 51d. Female threads 52c for attaching a conversion lens and an optical filter, such as a polarizing filter or a protective filter, are formed at the distal end of the first holder 52.

The second lens group support frame 54 is fixed to the second holder 55 and supports the second lens group G2. The second lens group support frame 54 and second holder 55 constitute the second lens group unit 77 (an example of the first lens unit). The second holder 55 has three convex portions 55b that are disposed at a constant pitch around the optical axis AZ, and three cam pins 82 that are fixed to the convex portions 55b. The cam pins 82 are inserted into the second cam grooves 51b. The convex portions 55b are inserted into the linear through-grooves 50c of the fixed frame 50. This configuration allows the second lens group support frame 54 and the second holder 55 to move in the Z axis direction without rotating with respect to the fixed frame 50. The amount of movement of the second lens group support frame 54 and the second holder 55 with respect to the fixed frame 50 is determined by the shape of the second cam grooves 51b.

The third lens group support frame 56 is a member that supports the third lens group G3 (more precisely, the sixth lens L6 that functions as a focus lens), and has a bearing part 56a, an anti-rotation part 56b, a first rack support 56c, second rack support 56e, and a protrusion 56d. The sixth lens L6 and the third lens group support frame 56 constitute the focus lens unit 75. The second holder 55 supports the front ends of two guide poles 63a and 63b that extend in the Z axis direction. A guide pole support plate 65 is a member for supporting the rear end of the guide pole 63a (an example of the guide shaft), and is fixed on the imaging sensor 11 side of the second holder 55. The guide pole 63a is inserted into the bearing part 56a, and the guide pole 63b is inserted into the anti-rotation part 56b. The third lens group support frame 56 is supported movably in the Z axis direction by the guide poles 63a and 63b while being restricted in rotation around the optical axis AZ.

The first rack support 56c and the second rack support 56e are portions disposed on the Z axis direction negative side of the bearing component 56a, and support the rack 66 integrally movably in the axial direction and rotatably around the rotational axis R2. More specifically, the rack 66 (an example of the transmission member) has a base 66d disposed between the first rack support 56c and the second rack support 56e, a rack body 66a (an example of the transmission member body) disposed at the end of the base 66d, and a shaft 66b that extends in the Z axis direction from the base 66d. The base 66d is smaller in the Z axis direction than the rack body 66a.

The rack body 66a is a portion that mates with a lead screw 64a (discussed below), and has a plurality of teeth 66c that mesh with the lead screw 64a. The rack 66 converts the rotary motion of the lead screw 64a into linear motion in the Z axis direction. The rack body 66a is substantially in a U shape, and opens toward the opposite side from the rotational axis R2 (an example of the second rotational axis). The direction in which the rack body 66a opens refers to the direction of movement of the lead screw 64a when the lead screw 64a is removed from the rack body 66a, for example. In a state in which the drive unit 70 (discussed below) is fixed to second holder 55, the rack body 66a opens substantially toward the circumferential direction.

The shaft 66b is rotatably supported by the first rack support 56c and the second rack support 56e. This allows the rack body 66a to rotate with respect to the third lens group support frame 56 around the rotational axis R2.

Furthermore, as shown in FIGS. 9, 11, and 12, a torsion coil spring 68 (an example of the elastic member) is disposed between the base 66d and the second rack support 56e. The torsion coil spring 68 has a coiled part 68a that generates elastic force, a first end 68b, and a second end 68c. The coiled part 68a is placed over the shaft 66b of the rack 66. In a state in which the coiled part 68a is twisted, the first end 68b is hooked onto the bearing component 56a and the second rack support 56e, and the second end 68c is hooked onto the rack body 66a of the rack 66. The torsion coil spring 68 imparts rotational force in the A direction to the rack 66. That is, the torsion coil spring 68 imparts rotational force to the rack 66 so that the rack body 66a moves to the outer peripheral side (the outside in the radial direction perpendicular to the optical axis AZ) with respect to the third lens group support frame 56. Since rotational force is imparted, the rack 66 is always pressed against the lead screw 64a. This reduces backlash between the rack 66 and the lead screw 64a, and improves positional accuracy of the focus lens unit 75 with respect to the second lens group unit 77. Also, since the rack 66 is always pressed against the lead screw 64a, drive force can be transmitted more efficiently from the lead screw 64a to the rack 66.

Furthermore, the coiled part 68a of the torsion coil spring 68 is compressed in the Z axis direction (a direction parallel to the rotational axis R2) between the second rack support 56e and the base 66d. The torsion coil spring 68 imparts a pressing force F to the rack 66, and the rack 66 is pressed against the first rack support 56c by the torsion coil spring 68. This suppresses movement of the rack 66 in the Z axis direction with respect to the third lens group support frame 56, and further improves positional accuracy of the focus lens unit 75.

The drive unit 70 is fixed to the second holder 55. The drive unit 70 has a focus motor 64 (an example of an actuator) and a motor holder 64c (an example of a support plate) that is fixed to the focus motor 64. The focus motor 64 is a stepping motor, for example. The focus motor 64 has a motor body 64g and a lead screw 64a (an example of a drive shaft) that extends in the Z axis direction from the motor body 64g. The motor body 64g rotates the lead screw 64a around the rotational axis R1 (an example of the first rotational axis) disposed parallel to the optical axis AZ. The motor holder 64c is fixed to the focus motor 64, and rotatably supports the lead screw 64a. The rack 66 meshes with the lead screw 64a.

The protrusion 56d is a portion for detecting the starting point of the focus lens unit 75, and is provided at a location that can pass through the detection region of a photosensor 67 (discussed below). In this embodiment, since the third lens group G3 (a focus lens group) is formed by the single sixth lens L6, the weight of the third lens group G3 can be 1 g or less, for example, which allows the drive speed with the focus motor 64 to be higher.

The fourth lens group support frame 61 has a first support frame 57, a second support frame 58, a third support frame 59, and a fourth support frame 60. The fourth lens group G4 and the fourth lens group support frame 61 constitute a fourth lens group unit 78.

The first support frame 57 supports the seventh lens L7. The second support frame 58 supports the eighth lens L8 and the ninth lens L9, and also supports the first support frame 57 movably in two directions perpendicular to the optical axis AZ. The second support frame 58 has three cam pins 80 that are disposed at a constant pitch around the optical axis AZ.

The third support frame 59 supports the tenth lens L10 and the eleventh lens L11, and is fixed by screws, for example, to the second support frame 58. The fourth support frame 60 supports the twelfth lens L12, and is fixed by screws, for example, to the third support frame 59. Because of their configuration, the first support frame 57, the second support frame 58, the third support frame 59, and the fourth support frame 60 move integrally along the optical axis AZ.

The first support frame 57 is supported by the second support frame 58 so as to be movable in two directions perpendicular to the optical axis AZ, for example. This configuration allows the first support frame 57 to move integrally in the Z axis direction with respect to the second support frame 58, the third support frame 59, and the fourth support frame 60, while allowing movement in a direction perpendicular to the optical axis AZ.

The zoom ring unit 83 has a ring base 86, the zoom ring 84, and a linear position sensor 87 that detects the rotational position of the zoom ring 84. The "rotational position of the zoom ring 84" refers to the position of the zoom ring 84 in the rotational direction, and can also be considered to be the rotational angle of the zoom ring 84 from a reference position.

The zoom ring 84 has a cylindrical shape, and is supported by the ring base 86 fixed to the fixed frame 50, so as to be movable around the optical axis AZ in a state in which movement in the Z axis direction is restricted. The zoom ring 84 has a through-hole 84a at the end on the Z axis direction negative side. A zoom drive pin 85 that is fixed to the cam barrel 51 is inserted into the through-hole 84a. Consequently, the cam barrel 51 rotates integrally with the zoom ring 84 around the optical axis AZ.

The linear position sensor 87 detects the rotational position and rotational direction in which the user has put the zoom ring 84, and sends the detection result to the lens microcomputer 40. More specifically, the linear position sensor 87 is fixed to the ring base 86 and has a slider 87a that protrudes outward in the radial direction. This slider 87a is inserted into a cam groove 84b formed in the zoom ring 84. When the zoom ring 84 is rotated with respect to the fixed frame 50, the slider 87a moves in the Z axis direction along the cam groove 84b. The linear position sensor 87 has a varistor, and when the slider 87a sliders over a magnetic resistor that is inside this varistor, output (output voltage) that is proportional to the position of the slider 87a in the Z axis direction can be obtained linearly between terminals at both ends to which a specific voltage has been applied. The output of the linear position sensor 87 is converted into rotational position information, which allows the rotational position of the zoom ring 84 to be detected. The focal length of the optical system L is displayed on the outer peripheral face of the zoom ring 84.

Since the first lens group G1 to fourth lens group G4 are mechanically linked via the lens support mechanism 71, the absolute positions of the first lens group G1 to fourth lens group G4 (such as their positions using a light receiving face 11a of the imaging sensor 11 as a reference) have a specific relationship to the rotational position of the zoom ring 84. Therefore, if the rotational position of the zoom ring 84 is detected, the absolute positions of the first lens group G1 to fourth lens group G4 with respect to the lens mount 95 can be ascertained. The zoom ring 84 may have another structure instead, such as a movable lever.

The focus ring unit 88 has a focus ring 89 and a focus ring angle detector 90 that detects the rotational angle of the focus ring 89. The focus ring 89 has a cylindrical shape, and is supported by the ring base 86 rotatably around the optical axis AZ in a state in which movement in the Z axis direction is restricted. The rotational angle and rotational position of the focus ring 89 can be detected by the focus ring angle detector 90. The focus ring angle detector 90 has two photosensors (not shown), for example. The focus ring 89 has a plurality of protrusions 89a that protrude inward in the radial direction and are disposed at equidistant spacing in the rotational direction. Each of these photosensors has a light emitting part (not shown) and a light receiving part (not shown), and the plurality of protrusions 89a pass in between the light emitting parts and the light receiving parts, allowing the rotational angle and rotational direction of the focus ring 89 to be detected. The focus ring 89 may have another structure instead, such as a movable lever.

(3) Focus Adjusting Unit

The focus adjusting unit 72 has the focus motor 64, a focus drive controller 41, and the photosensor 67. The focus motor 64 is fixed to the second holder 55 and drives the focus lens unit 75 in the Z axis direction with respect to the second lens group unit 77. The drive of the focus lens unit 75 with respect to the second lens group unit 77 is performed by the focus motor 64 alone. In other words, in a state in which the focus motor 64 is not driving the focus lens unit 75 (such as when no power is being supplied to the focus motor 64), the focus lens unit 75 cannot be moved with respect to the second lens group unit 77. In this case, the focus lens unit 75 moves in the Z axis direction integrally with the second holder 55.

The lead screw 64a of the focus motor 64 rotates on the basis of a drive signal inputted from the focus drive controller 41. The rotary motion generated by the focus motor 64 is converted by the lead screw 64a and the rack 66 into linear motion of the focus lens unit 75 in the Z axis direction. Consequently, the focus lens unit 75 can move in the Z axis direction with respect to the second lens group unit 77.

With this digital camera 1, to achieve a zoom lens system with which the focal length can be varied while keeping the subject distance substantially constant, the focus lens unit 75 is driven by the focus adjusting unit 72 on the basis of a tracking table stored ahead of time in the lens microcomputer 40. This type of tracking is called electronic tracking here.

The tracking table contains information indicating the position of the focus lens unit 75 where the focused subject distance remains substantially constant even if the focal length changes (more precisely, the position of the focus lens unit 75 with respect to the second lens group unit 77). The phrase "the subject distance remains substantially constant" means that the amount of change in the subject distance falls within a specific subject field depth. Electronic tracking will be discussed below.

The photosensor 67, which detects the starting point position of the focus lens unit 75, is installed in the second holder 55. This photosensor 67 has a light emitting part (not shown) and a light receiving part (not shown). When the protrusion 56d of the third lens group support frame 56 passes between the light emitting part and the light receiving part, the photosensor 67 can detect the presence of the protrusion 56d. That is, the starting point position of the focus lens unit 75 with respect to the second lens group unit 77 can be detected by the photosensor 67. In other words, the photosensor 67 is a starting point detector that detects the starting point position of the third lens group G3 with respect to the second lens group G2. The lens microcomputer 40 drives the third lens group G3 to the starting point position, and checks whether the focus lens unit 75 (the third lens group G3) is in the starting point position by using a signal from the photosensor 67.

The starting point position that can be detected by the photosensor 67 is an absolute position that never moves with respect to the second lens group unit 77. Accordingly, when the position of the focus lens unit 75 is reset to the starting point position with respect to the second lens group unit 77, the photosensor 67 drives the focus lens unit 75 to the position where the protrusion 56d for starting point detection is detected. When the power switch 25 is turned off, the focus lens unit 75 is driven by the focus motor 64 to a position where the protrusion 56d of the third lens group 56 is detected by the photosensor 67 regardless of the position of focus lens unit 75, for example. Upon completion of the drive of the focus lens unit 75, the power supply to the digital camera 1 is halted. Conversely, when a power switch 25 of the digital camera 1 is turned on, the focus motor 64 drives the focus lens unit 75 to a specific position determined on the basis of the tracking table. The starting point detector is not limited to being a photosensor, and may instead be a combination of a magnet and a magnetic sensor, for example.

(4) Aperture Adjusting Unit

The aperture adjusting unit 73 has the aperture unit 62 fixed to the second support frame 58, an aperture drive motor (not shown) that drives the aperture unit 62, and an aperture drive controller 42 that controls the aperture drive motor. The aperture drive motor is a stepping motor, for example. The aperture drive motor is driven on the basis of a drive signal inputted from the aperture drive controller 42. The drive force generated by the aperture drive motor drives aperture blades 62a in the opening and closing directions. The aperture value of the optical system L can be changed by driving the aperture blades 62a.

(5) Blur Correction Unit

The blur correction unit 74 is for reducing blurring of the optical image attributable to movement of the interchangeable lens unit 2 and the camera body 3, and has an electromagnetic actuator 46, a position detecting sensor 47, and a blur correction microcomputer 48.

The electromagnetic actuator 46 drives the first support frame 57 in a direction perpendicular to the optical axis AZ. More specifically, the electromagnetic actuator 46 has a magnet (not shown) and a coil (not shown), for example. For instance, the coil is provided to the first support frame 57, and the magnet is fixed to the second support frame 58.

The position detecting sensor 47 is for detecting the position of the first support frame 57 with respect to the second support frame 58, and is a hole element, for example. A movement detecting sensor (not shown) such as a gyro sensor is installed in the interchangeable lens unit 2. The blur correction microcomputer 48 controls the electromagnetic actuator 46 on the basis of the detection result of the position detecting sensor 47 and the detection result of the movement detecting sensor. Consequently, blurring of the optical image attributable to movement of the digital camera 1 can be reduced.

Reducing blurring of the subject image may instead be accomplished by electronic blur correction, in which blurring that appears in an image is corrected on the basis of image data outputted from the imaging sensor 11. Also, blurring of the subject image may be reduced by a sensor shift method in which the imaging sensor 11 is driven in two directions perpendicular to the optical axis AZ.

(6) Lens Microcomputer

The lens microcomputer 40 has a CPU (not shown), a ROM (not shown), and a memory 40a, and various functions can be performed by reading programs stored in the ROM into the CPU. For instance, the lens microcomputer 40 can check whether the focus lens unit 75 is in the starting point position by using a detection signal from the photosensor 67.

The memory 40a is a nonvolatile memory, and can hold stored information even when no power is being supplied. The memory 40a contains a tracking table (discussed below) for realizing a zoom lens system, or information related to the interchangeable lens unit 2 (lens information), for example. The lens microcomputer 40 controls the focus motor 64, and the focus lens unit 75 is driven by the focus motor 64 in the Z axis direction, on the basis of this tracking table. An operation in which the position of the focus lens unit 75 is made to conform to changes in the focal length on the basis of a tracking table will hereinafter be referred to as electronic tracking.

The lens microcomputer 40 has a counter 40b for counting the number of pulses of the focus motor 64. The counter 40b is set to a count of "+1" when the focus lens unit 75 is driven to the Z axis direction positive side, and to a count of "−1" when the focus lens unit 75 is driven to the Z axis direction negative side. The lens microcomputer 40 can ascertain the relative position of the third lens group G3 with respect to the second lens group G2 (the position of the focus lens unit 75 with respect to the second lens group unit 77) by thus counting the number of drive pulses of the focus motor 64.

For example, the rack 66 is driven by 0.6 mm in the Z axis direction for every rotation of the lead screw 64a of the focus motor 64. If the focus motor 64, which has a 10-pole magnet, is driven by 1-2 phase excitation, then the rack 66 is driven in the Z axis direction by 0.6/20/2=0.015 mm (15 µm) per pulse. During micro-step drive, the rack 66 can be driven in even finer units. Using a stepping motor allows the focus lens unit 75 to be driven in fine units, and reduces backlash during reverse drive, for example. That is, selecting a stepping motor as the focus motor 64 affords very precise focus adjustment. Also, counting the number of drive pulses allows the current position of the focus lens unit 75 with respect to the second lens group unit 77 to be ascertained, and allows the amount of drive of the focus lens unit 75 to be calculated.

Camera Body

The basic configuration of the camera body 3 will be described through reference to FIGS. 1 to 4B. As shown in FIGS. 1 to 4B, the camera body 3 has a case 3a, a body mount 4, an operating unit 39, an image acquisition unit 35, an image display unit 36, a viewfinder unit 38, a body microcomputer 10, and a battery 22.

(1) Case

The case 3a constitutes the outer part of the camera body 3. As shown in FIGS. 4A and 4B, the body mount 4 is provided to the front face of the case 3a, and the operating unit 39 is provided to the rear and top faces of the case 3a. More specifically, a display unit 20, the power switch 25, a mode selector dial 26, a navigation key 27, a menu setting button 28, a setting button 29, a capture mode selector button 34, and a moving picture capture operation button 24 are provided to the rear face of the case 3a. A shutter button 30 is provided to the top face of the case 3a.

(2) Body Mount

The body mount 4 is the portion of the interchangeable lens unit 2 where the lens mount 95 is mounted, and has a body-side contact (not shown) that can be electrically connected with the lens-side contact 91. The camera body 3 is able to send and receive data to and from the interchangeable lens unit 2 via the body mount 4 and the lens mount 95. For example, the body microcomputer 10 (discussed below) sends the lens microcomputer 40 a control signal, such as an exposure synchronization signal, via the body mount 4 and the lens mount 95.

(3) Control Unit

As shown in FIGS. 4A and 4B, the operating unit 39 has various controls that the user can use to input operating information. For instance, the power switch 25 is a switch for turning the power on and off to the digital camera 1 or the camera body 3. When the power is turned on with the power switch 25, power is supplied to the various parts of the camera body 3 and the interchangeable lens unit 2.

The mode selector dial 26 is used to switch the operating mode, such as still picture capture mode, moving picture capture mode, or reproduction mode, and the user can turn the mode selector dial 26 to switch the operating mode. When the still picture capture mode is selected with the mode selector dial 26, the operating mode is switched to the still picture capture mode, and when the moving picture capture mode is selected with the mode selector dial 26, the operating mode is switched to the moving picture capture mode. In the moving picture capture mode, basically moving picture capture is possible. When the reproduction mode is selected with the mode selector dial 26, the operating mode is switched to the reproduction mode, allowing the captured image to be displayed on the display unit 20.

The navigation key 27 is used to select the left, right, up, and down directions. The user can use the navigation key 27 to select the desired menu from various menu screens displayed on the display unit 20, for example.

The menu setting button 28 is for setting the various operations of the digital camera 1. The setting button 29 is for executing the operations of the various menus.

The moving picture capture operation button 24 is for starting and stopping the capture of moving pictures. Even if the operating mode selected with the mode selector dial 26 is the still picture capture mode or the reproduction mode, when the moving picture capture operation button 24 is pressed, the operating mode is forcibly changed to the moving picture capture mode, and moving picture capture begins, regardless of the setting on the mode selector dial 26. When this moving picture capture operation button 24 is pressed during the capture of a moving picture, the moving picture capture ends and the operating mode changes to the one selected on the mode selector dial 26, that is, to the one prior to the start of moving picture capture. For example, if the still picture capture mode has been selected with the mode selector dial 26 when the moving picture capture operation button 24 is pressed, the operating mode automatically changes to the still picture capture mode after the moving picture capture operation button 24 is pressed again.

The shutter button 30 is pressed by the user to capture an image. When the shutter button 30 is pressed, a timing signal is outputted to the body microcomputer 10. The shutter button 30 is a two-stage switch that can be pressed halfway down or all the way down. Light measurement and ranging are commenced when the user presses the button half way down. When the user presses the shutter button 30 all the way down in a state in which the shutter button 30 has been pressed half way down, a timing signal is outputted, and image data is acquired by the image acquisition unit 35.

As shown in FIG. 2, a lens attachment button 99 for attaching and removing the interchangeable lens unit 2 to and from the camera body 3 is provided to the front face of the camera body 3. The lens attachment button 99 has a contact (not shown) that is in its "on" state when the button is pressed by the user, for example, and is electrically connected to the body microcomputer 10. When the lens attachment button 99 is pressed, the built-in contact is switched on, and the body microcomputer 10 recognizes that the lens attachment button 99 has been pressed.

(4) Image Acquisition Unit

The image acquisition unit 35 mainly comprises the imaging sensor 11 such as a CCD (Charge Coupled Device) that performs opto-electrical conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11.

The imaging sensor 11 is a CCD (Charge Coupled Device) sensor, for example, that converts the optical image formed by the optical system L into an electrical signal. The imaging sensor 11 is driven and controlled on the basis of timing signals generated by the imaging sensor drive controller 12. The imaging sensor 11 may instead be a CMOS (Complementary Metal Oxide Semiconductor) sensor.

The shutter controller 31 drives a shutter drive actuator 32 and operates the shutter unit 33 according to a control signal outputted from the body microcomputer 10 that has received a timing signal.

The auto-focusing method that is employed in this embodiment is a contrast detection method that makes use of image data produced by the imaging sensor 11. Using a contrast detection method allows high-precision focal adjustment.

(5) Body Microcomputer

The body microcomputer 10 is a control device that is the command center of the camera body 3, and controls the various components of the digital camera 1 according to operation information inputted to the operation unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 has the function of detecting that the interchangeable lens unit 2 has been mounted to the camera body 3, or the function of acquiring information about controlling the digital camera 1, such as information about the focal length from the interchangeable lens unit 2.

The body microcomputer 10 is able to receive signals from the power switch 25, the shutter button 30, the mode selector dial 26, the navigation key 27, the menu setting button 28, and the setting button 29. Various information related to the camera body 3 is held in a memory 10a inside the body microcomputer 10. The memory 10a is a nonvolatile memory, and can hold stored information even when no power is being supplied.

Also, the body microcomputer 10 periodically produces a vertical synchronization signal, and produces an exposure synchronization signal on the basis of the vertical synchronization signal in parallel with the production of the vertical synchronization signal. The body microcomputer 10 can produce an exposure synchronization signal, since the body microcomputer 10 ascertains beforehand the exposure start timing and the exposure stop timing based on the vertical synchronization signal. The body microcomputer 10 outputs a vertical synchronization signal to a timing generator (not shown), and outputs an exposure synchronization signal at a specific period to the lens microcomputer 40 via the body mount 4 and the lens mount 95. The lens microcomputer 40 acquires position information about the focus lens unit 75.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer part (not shown) the image data produced by numerous opto-electrical conversion element (not shown) present in the imaging sensor 11, according to the read signal.

The body microcomputer 10 also controls the focus adjusting unit 72 (discussed below) via the lens microcomputer 40.

The image signal outputted from the imaging sensor 11 is sent from an analog signal processor 13 and successively processed by an A/D converter 14, a digital signal processor 15, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement. The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JEPG was used to compress a plurality of image signals, compressing an image signal for each frame, and an H.264/AVC method can also be used, in which compression is performed on image signals for a plurality of frames all at once.

The image recorder 18 produces a still picture file or moving picture file that is associated with specific information to be recorded with the image signal. The image recorder 18 also records the still picture file or moving picture file on the basis of a command from the image recording controller 19. The image recorder 18 is a removable memory and/or an internal memory, for example. The specific information to be recorded with the image signal includes the date the image was captured, focal length information, shutter speed information, aperture value information, and photography mode information. Still picture files are in Exif (TRADEMARK) format or a format similar to Exif (TRADEMARK) format. Moving picture files are in H.264/AVC format or a format similar to H.264/AVC format.

(6) Image Display Unit

The image display unit 36 has the display unit 20 and an image display controller 21. The display unit 20 is a liquid crystal monitor, for example. The display unit 20 displays as a visible image the image signal recorded to the buffer memory 16 or the image recorder 18 on the basis of a command from the image display controller 21. Possible display modes on the display unit 20 include a display mode in which only the image signal is displayed as a visible image, and a display mode in which the image signal and information from the time of capture are displayed as a visible image.

(7) Viewfinder

The viewfinder unit 38 has a liquid crystal viewfinder 8 that displays the image acquired by the imaging sensor 11, and a viewfinder eyepiece window 9 provided to the rear face of the case 3a. The user looks into the viewfinder eyepiece window 9 to view the image displayed on the liquid crystal viewfinder 8.

(8) Battery

The battery 22 supplies power to the various components of the camera body 3, and also supplies power to the interchangeable lens unit 2 via the lens mount 95. In this embodiment, the battery 22 is a rechargeable battery. The battery 22 may be a dry cell, or may be an external power supply, with which power is supplied from the outside through a power cord.

Tracking Table

Figure 15:
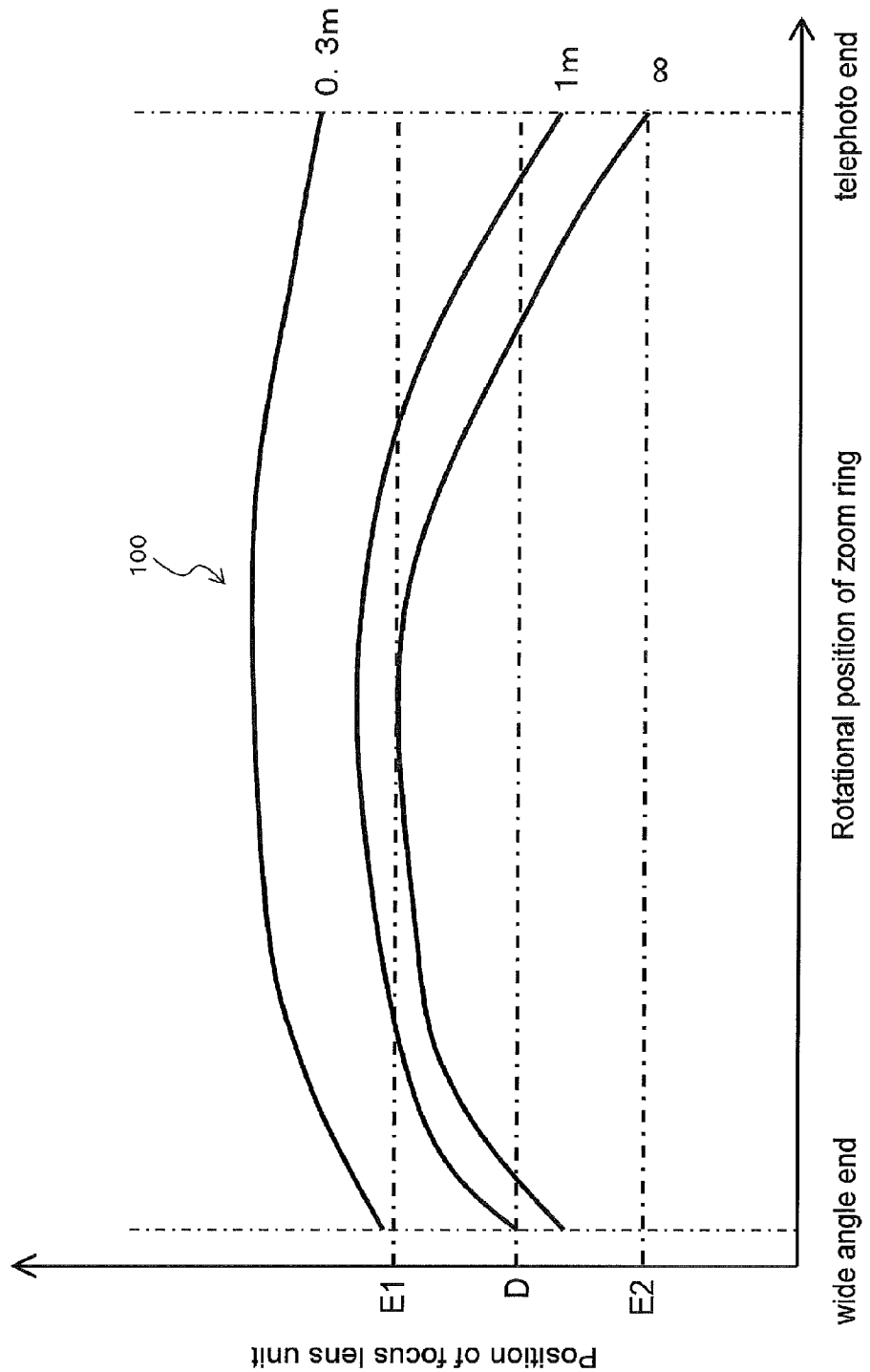
FIG. 15 is a tracking table used for a zoom lens system.

With the digital camera 1, electronic tracking is performed by the focus adjusting unit 72 so that the focal length can be varied while the subject distance is kept substantially constant. More specifically, as shown in FIG. 15, to perform electronic tracking, a tracking table 100 is held in the memory 40a. This tracking table 100 shows the relationship between the rotational position of the zoom ring 84 and the position of the focus lens unit 75 in the Z axis direction with respect to the second lens group unit 77. For example, the memory 40a holds three tracking tables 100 corresponding to subject distances of 0.3 m, 1.0 m, and infinity (∞).

The tracking table 100 consists of discrete information in which the rotational position of the zoom ring 84 and the position of the focus lens unit 75 in the Z axis direction are divided into several groups. In general, the number of divisions is determined so that the subject distance will fit within a specific subject field depth even if the zoom ring 84 is turned.

The rotational position of the zoom ring 84 (position in the rotational direction) can be detected by the linear position sensor 87. On the basis of this detection result and the tracking table 100, the lens microcomputer 40 can determine the position of the focus lens unit 75 in the Z axis direction with respect to the second lens group unit 77.

The starting point position D of the focus lens unit 75 with respect to the second lens group unit 77 is detected by the photosensor 67, which is indicated by the one-dot chain line in FIG. 15. In this embodiment, the starting point position D is located near the center of the movement range of the focus lens unit 75 (between positions E1 and E2) in the infinity tracking table 100. Thus disposing the starting point position D near the center allows the focus lens unit 75 to be moved relatively quickly to any position when the power is turned on to the digital camera 1.

The reason the starting point position D is determined using the infinity tracking table 100 as a reference is that there is a higher probability of capturing the subject at the infinity position when the user turns on the power to the digital camera 1 to photograph the subject.

The tracking table 100 may also be expressed by a polynomial, rather than discrete information divided into several groups. Position information about the first lens group G1, second lens group G2, or fourth lens group G4 in the Z axis direction may also be used instead of the rotational position of the zoom ring 84. The "position of the focus lens unit 75 in the Z axis direction with respect to the second lens group unit 77" can be rephrased as the position of the third lens group G3 in the Z axis direction with respect to the second lens group unit 77, or the position of the third lens group G3 in the Z axis direction with respect to the second lens group G2.

Layout of Drive Unit

Figure 16:
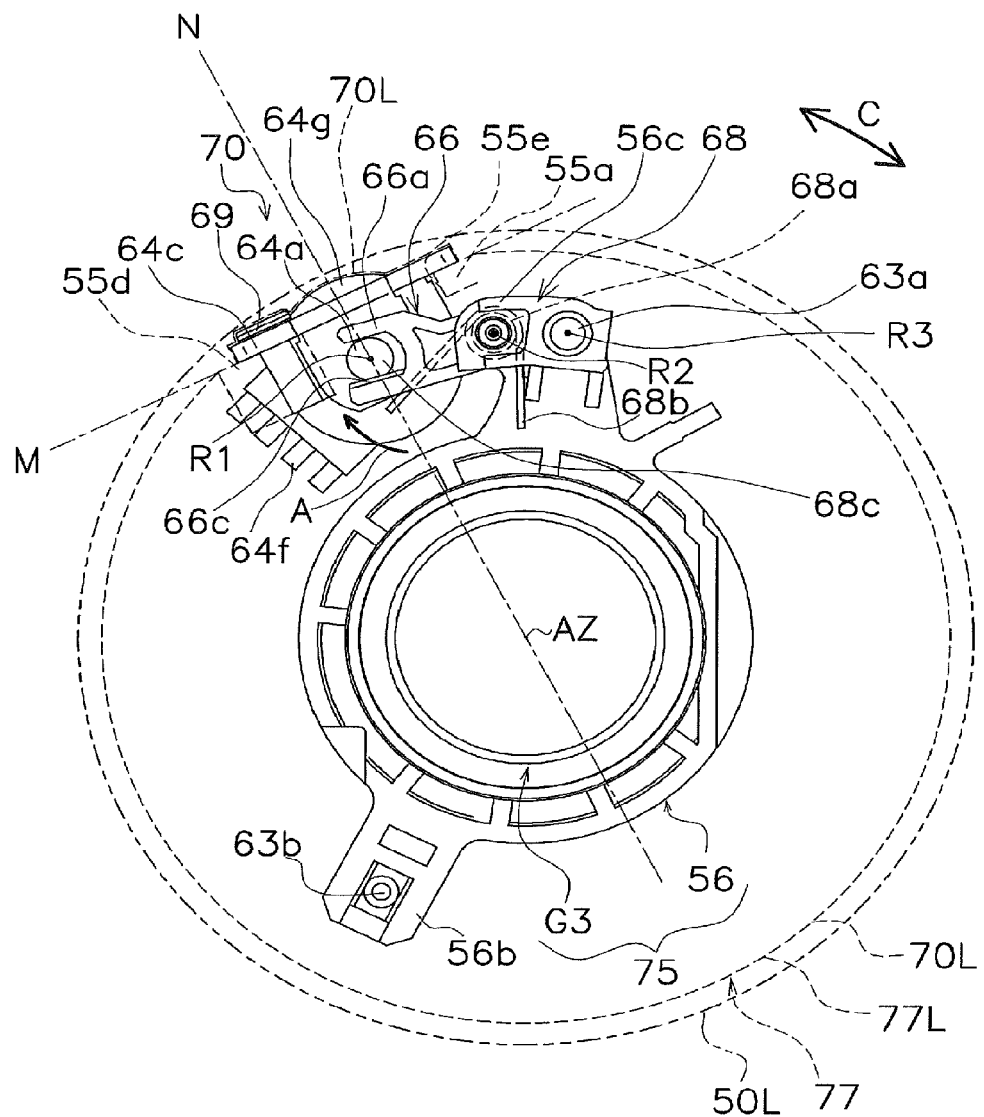
FIG. 16 is a plan view of the focus lens unit.
Figure 17:
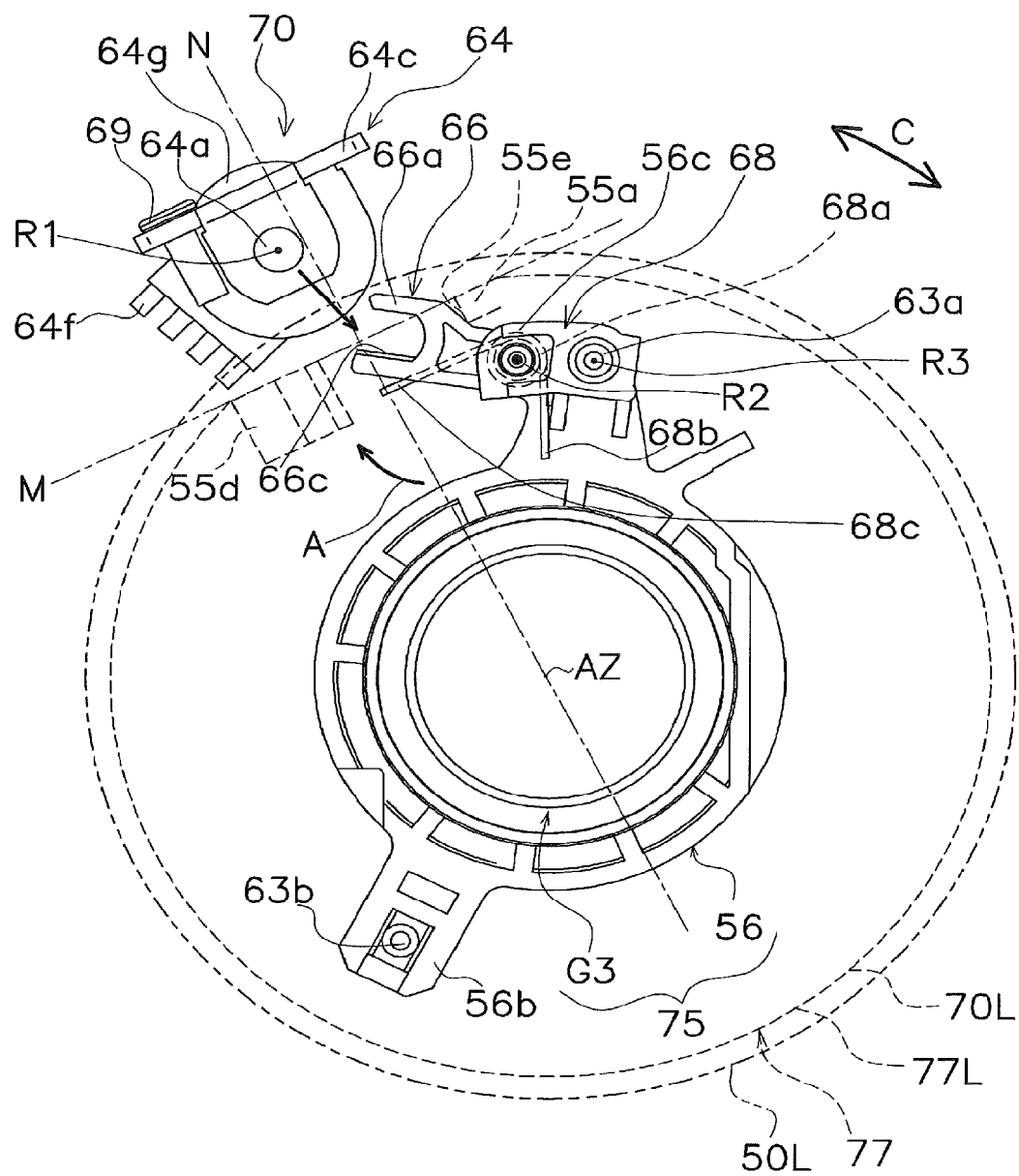
FIG. 17 is a plan view of the focus lens unit (during assembly)

This digital camera 1 is characterized by the layout of the drive unit 70. The layout of the drive unit 70 will be described through reference to FIGS. 9, 10, 16, and 17. FIG. 16 is a plan view of the focus lens unit 75. FIG. 17 is a plan view of the focus lens unit 75 when the drive unit 70 is attached. FIGS. 16 and 17 are plan views of when the focus lens unit 75 is viewed from the Z axis direction negative side.

As shown in FIG. 16, the drive unit 70 is fixed to the second lens group unit 77 so that a profile line formed by the second lens group unit 77 and the drive unit 70 when viewed in a direction along the optical axis AZ will be substantially circular. More specifically, the drive unit 70 is fixed to the second holder 55 so that a first profile line 70L formed by the second holder 55 and the drive unit 70 is substantially circular. The first profile line 70L formed by the second holder 55 and the drive unit 70 substantially follows the inner peripheral face S0L of the fixed frame 50 when viewed in the Z axis direction.

Here, in determining the first profile line 70L, portions that protrude to the outside in order to come into contact with another member (the fixed frame 50 and the cam barrel 51 here), such as the cam pin 82 and the protrusion 55b, are not taken into account.

The motor holder 64c of the drive unit 70 is fixed to the second holder 55 so as to face the third lens group G3. More precisely, the second holder 55 has a first support 55a, a second support 55d, an opening 55e, and a holder 55c. The first support 55a is a portion that sticks out in the Z axis direction, and supports the holder body 64e. The second support 55d is a portion that sticks out in the Z axis direction, and the holder body 64e is fixed with screws 69.

The first support 55a and the second support 55d are disposed with a space in the circumferential direction around the optical axis AZ (such as the C direction shown in FIG. 16). The circumferential direction referred to here is a direction that follows an arc around the optical axis AZ. The opening 55e is formed between the first support 55a and the second support 55d. The lead screw 64a of the focus motor 64 is disposed in this opening 55e. The motor body 64g of the focus motor 64 is held in the holder 55c. The drive unit 70 has four terminals 64f to which power is supplied. As shown in FIG. 16, the terminals 64f stick out from the motor body 64g of the focus motor 64 in the approximate circumferential direction. More precisely, the terminals 64f stick out on the opposite side from the rotational axis R2 with respect to the rotational axis R1. This makes it easy to ensure enough space to hold the electrical wiring connected to the terminals 64f.

The motor holder 64c has the flat holder body 64e that extends substantially parallel to the rotational axis R1. For instance, an imaginary line N that is perpendicular to the holder body 64e and intersects the rotational axis R1 overlaps the third lens group G3 when viewed in the Z axis direction. In this embodiment, the imaginary line N intersects the optical axis AZ. The imaginary line N is perpendicular to a plane M parallel to the holder body 64e.

The rack body 66a opens substantially toward the circumferential direction in a state in which the drive unit 70 is fixed to the second holder 55. The torsion coil spring 68 imparts rotational force to the rack 66 so that the rack body 66a rotates around the rotational axis R2 facing outside of the second holder 55. Accordingly, as shown in FIG. 17, in a state in which the drive unit 70 is not fixed to the second holder 55, the rack body 66a is pressed against the first support 55a of the second holder 55 by the torsion coil spring 68. In this state, the rack 66 is stationary with respect to the second holder 55. Accordingly, since the rack body 66a is stationary with respect to the second holder 55 in a state of facing outward more than in the circumferential direction, when the drive unit 70 is assembled, it is easier to attach the lead screw 64a to the rack body 66a. As shown in FIG. 17, the second holder 55 has the first support 55a and the second support 55d. The motor holder 64c is fixed to the second support 55d by the two screws 69. The first support 55a supports the motor holder 64c. The opening 55e is formed between the first support 55a and the second support 55d in the circumferential direction. The holder 55c in which the focus motor 64 is held is formed on the Z axis direction positive side of the opening 55e.

As shown in FIG. 16, the drive unit 70, the rotational axis R2, and the guide pole 63a are disposed aligned in the circumferential direction. More specifically, the drive unit 70 is aligned with the rotational axis R2 in the circumferential direction, and the rotational axis R2 is aligned with the guide pole 63a in the circumferential direction. The lead screw 64a is aligned with the rotational axis R2 in the circumferential direction. Accordingly, the rack body 66a is disposed so as to open substantially in the circumferential direction. The rotational axis R2 is disposed between the drive unit 70 and the guide pole 63a in the circumferential direction.

The rotational axis R1, the rotational axis R2, and the center R3 of the guide pole 63a are disposed at substantially the same position in the radial direction. In other words, the rotational axis R1, the rotational axis R2, and the center R3 are disposed on substantially the same circumference.

Assembly Work

The work of assembling the second lens group unit 77, the focus lens unit 75, and the drive unit 70 will now be described.

The assembly of the second lens group unit 77 is performed, and the guide poles 63a and 63b are fixed to the second holder 55 of the second lens group unit 77.

Next, the assembly of the focus lens unit 75 is performed. More specifically, the third lens group G3 is fixed to the third lens group support frame 56. The shaft 66b of the rack 66 is inserted into the torsion coil spring 68, and in this state the rack 66 is attached to the first rack support 56c and the second rack support 56e.

After the assembly of the focus lens unit 75, the focus lens unit 75 is attached to the guide poles 63a and 63b. More specifically, the guide pole 63a is inserted into the bearing component 56a, and the guide pole 63b is inserted into the anti-rotation component 56b. The focus lens unit 75 is slide along the guide poles 63a and 63b until the rack 66 is disposed within the opening 55e of the second holder 55.

As shown in FIG. 17, since the rack 66 is pushed in the A direction with respect to the third lens group support frame 56 by the elastic force of the torsion coil spring 68, the rack 66 is pressed against the first support 55a by the torsion coil spring 68 and does not fall inside (the third lens group G3 side; in the opposite direction from the A direction). In this state, the rack body 66a of the rack 66 is disposed in the opening 55e, and the rack body 66a opens outward more than in the circumferential direction.

After the focus lens unit 75 has been attached to the second lens group unit 77, as shown in FIG. 17, the drive unit 70 is attached from the outside of the second holder 55. At this point, the rack body 66a opens facing outward in a state of being disposed in the opening 55e, so even if the drive unit 70 is attached substantially facing inward in the radial direction (toward the optical axis AZ), the lead screw 64a can be mated relatively easily with the rack body 66a.

In a state in which the lead screw 64a is mated to the rack body 66a, the motor holder 64c is pushed against the first support 55a and the second support 55d. In this state, the motor holder 64c is fixed to the second support 55d by the screws 69, and the second lens group unit 77, the focus lens unit 75, and the drive unit 70 are in the assembly state shown in FIG. 16.

Thus, the size can be reduced and the drive unit 70 can be easily assembled by using the torsion coil spring 68 and changing the direction in which the rack body 66a faces more to the outside than in the circumferential direction during assembly.

Operation of the Digital Camera

The operation of the digital camera 1 will be described.

(1) Imaging Mode

This digital camera 1 has two imaging modes. More specifically, the digital camera 1 has a viewfinder imaging mode in which the user looks through the viewfinder eyepiece window 9 to view the subject, and a monitor imaging mode in which the user observes the subject on the display unit 20.

With the viewfinder imaging mode, the image display controller 21 drives the liquid crystal viewfinder 8, for example. As a result, an image of the subject (a so-called through-image) acquired by the imaging sensor 11 is displayed on the liquid crystal viewfinder 8.

With the monitor imaging mode, the display unit 20 is driven by the image display controller 21, for example, and a real-time image of the subject is displayed on the display unit 20. Switching between these two imaging modes can be performed with the capture mode selector button 34.

(2) Zoom Operation

Next, the operation of the interchangeable lens unit 2 when the user performs zooming will be described.

When the user rotates the zoom ring 84, the cam barrel 51 rotates along with the zoom ring 84. When the cam barrel 51 rotates around the optical axis AZ, the first holder 52 is guided by the first cam grooves 51d of the cam barrel 51, and advances in the Z axis direction. The second holder 55 and the fourth lens group support frame 61 are also guided by the second cam grooves 51b and the third cam grooves 51c of the cam barrel 51, and advance in the Z axis direction. Thus, by rotating the zoom ring 84, the state of the interchangeable lens unit 2 can be changed from the wide angle end state shown in FIGS. 5 and 6 to the telephoto end state shown in FIGS. 7 and 8. Consequently, the subject can be imaged at the desired zoom position by adjusting the rotational position of the zoom ring 84.

The second holder 55 is mechanically driven in the Z axis direction by rotating the zoom ring 84 here, but only the focus lens unit 75 is electrically driven and controlled by the focus adjusting unit 72 on the basis of the tracking table 100 stored ahead of time in the memory 40a, so that the subject distance remains substantially constant. For example, when the focus lens unit 75 is driven by the focus motor 64 on the basis of the tracking table 100, the focal state can be kept at infinity both when the move is from the wide angle end to the telephoto end, and when the move is from the telephoto end to the wide angle end.

More precisely, when the zoom ring 84 is turned, the first lens group G1, the second lens group G2, the third lens group G3, and the fourth lens group G4 move in the Z axis direction along the optical axis AZ. Consequently, the magnification of the subject image changes. At this point the third lens group G3 also moves in the Z axis direction along the optical axis AZ in a state of being supported by the second holder 55 via the third lens group support frame 56. When there is a relative change in the positional relationship of the first lens group G1, the second lens group G2, the third lens group G3, and the fourth lens group G4, the focal state of the subject image formed on the imaging sensor 11 also changes. That is, the subject distance at which the focal point is formed on the imaging sensor 11 changes.

In view of this, with the digital camera 1, even if the focal length changes, the subject distance can be kept substantially constant by driving the focus motor 64 according to the rotational position of the zoom ring 84. More specifically, using just the focus motor 64, the focus lens unit 75 including the third lens group G3 is driven with respect to the second lens group unit 77. The lens microcomputer 40 acquires the rotational position of the zoom ring 84 on the basis of the detection signal of the linear position sensor 87. At the same time, the lens microcomputer 40 calculates the position of the focus lens unit 75 with respect to the second lens group unit 77 from the count value at the counter 40b. Utilizing the plurality of tracking tables 100 shown in FIG. 15, the lens microcomputer 40 finds the current subject distance from these two pieces of information (the current rotational position of the zoom ring 84, and the position of the focus lens unit 75 with respect to the second lens group unit 77), and selects the tracking table 100 corresponding to the subject distance thus found. Here, we will assume that the tracking table 100 corresponding to infinity was selected.

Next, the lens microcomputer 40 again acquires the rotational position of the zoom ring 84, and finds the rotational speed of the zoom ring 84, that is, the rate of change in the focal length, from the amount of change in the rotational position of the zoom ring 84.

Next, the lens microcomputer 40 predicts the rotational position of the zoom ring 84 after the elapse of a specific time from the current rotational angle of the zoom ring 84 and the rotational speed of the zoom ring 84, and finds as a target position the position of the focus lens unit 75 in the Z axis direction corresponding to the predicted rotational position of the zoom ring 84. After the elapse of a specific time, the lens microcomputer 40 drives the focus motor 64 via the focus drive controller 41 so that the focus lens unit 75 will be located at this target position. Consequently, the focus lens unit 75 is driven so as to follow the movement of the other lens groups, and the subject distance is kept constant.

Thus, in the electronic tracking operation, the lens microcomputer 40 predicts the change in the focal length that will accompany zooming operation, and acquires from the tracking table 100 the target position of the focus lens unit 75 corresponding to the predicted focal length. The focus lens unit 75 is driven to the target position by the focus motor 64 in parallel with the zooming operation of the optical system L. Since this operation is executed at specific time intervals, even if the zoom ring 84 is rotated and the focal length of the optical system L changes, the focus lens unit 75 will move to the Z axis direction position corresponding to the focal length on the basis of the tracking table 100, and the drive of the focus lens unit 75 can conform to the change in the focal length. Consequently, the subject distance can be kept substantially constant regardless of any change in the focal length. The control of these components may be performed by the body microcomputer 10, rather than lens microcomputer 40.

Similarly, when the focused subject distance is short, such as 1 m, for example, the tracking table 100 for which the subject distance is 1 m is selected, and both when the move is from the wide angle end to the telephoto end, and when the move is from the telephoto end to the wide angle end, the focused state at a short distance can be maintained by driving the focus motor 64, and the zooming operation can be carried out smoothly.

In particular, since the focus lens unit 75 and the focus motor 64 move in the Z axis direction integrally with the second lens group unit 77, even if the user turns the zoom ring 84 quickly, the focus lens unit 75 can still be moved integrally with the second lens group unit 77. Therefore, if the subject distance is to be kept substantially constant before and after the zooming operation, the focus motor 64 may move the third lens group G3 by a distance obtained by subtracting the distance that the second lens group G2 is moved by the cam mechanism with respect to the imaging sensor 11 from the distance that the third lens group G3 is to be moved with respect to the imaging sensor 11. This makes it easy to keep up with fast operation of the zoom ring 84 by the user.

Also, in this embodiment, if a zooming operation is performed from the wide angle end to the telephoto end, with the subject distance at infinity, the focus lens unit 75 (more precisely, the third lens group G3, which is a focus lens group) must be moved in the Z axis direction by about 3 mm with respect to the imaging sensor 11. When the focus motor 64 is driven at 800 pps, the amount of drive of the focus lens unit 75 per rotation of the focus motor 64 is 0.6 mm as mentioned above, so it takes 0.25 second to move the focus lens unit 75 by 3 mm in the Z axis direction on the basis of the tracking table. Since it is possible to move the focus lens unit 75 from the wide angle end to the telephoto end in approximately 0.25 second, even if the user should turn the zoom ring 84 from the wide angle end to the telephoto end in 0.5 second, the drive of the focus lens unit 75 can keep up with the change in focal length. Consequently, even if the user should perform a quick zooming operation while looking at the subject on the display unit 20 in live preview mode, for example, the subject image that shows on the display unit 20 will be unlikely to be blurred, and this makes the camera easier to use.

(3) Focusing Operation

Next, the focusing operation of the digital camera 1 will be described. The digital camera 1 has two focus modes: an auto-focus imaging mode and a manual imaging mode. The user of the digital camera 1 can select the focus mode with a focus imaging mode setting button (not shown) provided to the camera body 3.

In the auto-focus imaging mode, auto-focus operation is performed by contrast detection method. When auto-focusing is performed by contrast detection method, the body microcomputer 10 asks the lens microcomputer 40 for contrast AF data. This contrast AF data is necessary in auto-focusing by contrast detection method, and includes, for example, the focus drive speed, focus shift amount, image magnification ratio, and information about whether contrast AF is possible.

The body microcomputer 10 monitors whether or not the shutter button 30 has been pressed half way down. If the shutter button 30 has been pressed half way down, the body microcomputer 10 issues an auto-focus commencement command to the lens microcomputer 40. This auto-focus commencement command is to start the auto-focus operation by contrast detection method. Upon receiving this command, the lens microcomputer 40 drives and controls the focus motor 64, which is a focus actuator. More precisely, the lens microcomputer 40 sends a control signal to the focus drive controller 41. On the basis of this control signal, the focus drive controller 41 drives the focus motor 64, and the focus lens unit 75 moves minutely.

The body microcomputer 10 calculates an evaluation value for auto-focus operation (hereinafter referred to as an AF evaluation value) on the basis of the received image data. More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the high-frequency component within the screen of the brightness signal. The AF evaluation value thus calculated is stored in a DRAM (not shown) in a state of being associated with the exposure synchronization signal. Since the lens position information acquired by the body microcomputer 10 from the lens microcomputer 40 is also associated with the exposure synchronization signal, the body microcomputer 10 can store the AF evaluation value with it associated with the lens position information.

Next, the body microcomputer 10 extracts as the focal point the position of the focus lens unit 75 where the AF evaluation value is at its maximum, on the basis of the AF evaluation value stored in the DRAM. The method for driving the focus lens unit 75 in the extraction of the focal point is generally known as a hill climbing method. With a hill climbing method, the focus lens unit 75 is moved in the direction of increasing the AF evaluation value, and the AF evaluation value is found for each position of the focus lens unit 75. This operation is continued until the maximum value for the AF evaluation value is detected, that is, until the AF evaluation value increases up to its peak and begins to decrease.

The body microcomputer 10 sends a control signal to the focus drive controller 41 via the lens microcomputer 40 so that the focus lens unit 75 will be driven to the position corresponding to the extracted focal point. The focus drive controller 41 produces a drive pulse for driving the focus motor 64 on the basis of a control signal from the body microcomputer 10 (or the lens microcomputer 40), for example. The focus motor 64 is driven by an amount corresponding to this drive signal, and the focus lens unit 75 moves in the Z axis direction to the position corresponding to the focal point.

Focusing in auto-focus imaging mode is performed in this way with the digital camera 1. The above operation is executed instantly when the user presses the shutter button 30 half way down.

Focusing by contrast detection method can also be carried out in monitor imaging mode (known as live preview mode), in which real-time image data can be produced with the imaging sensor 11. The reason for this is that in live preview mode, image data is produced in a steady state by the imaging sensor 11, and auto-focusing by contrast detection method using this image data is easy.

In live preview mode, since a real-time image of the subject is displayed on the display unit 20, the user can decide on the composition for taking the still picture or moving picture while looking at the display unit 20. Also, there is another imaging mode the user can select in addition to live preview mode using the display unit 20, which is a second live preview mode (viewfinder imaging mode) in which the subject image from the interchangeable lens unit 2 is guided to the liquid crystal viewfinder 8 (viewfinder unit 38).

The manual focus imaging mode will now be described.

When the user turns the focus ring 89, the focus ring angle detector 90 detects the rotational angle of the focus ring 89 and outputs a signal corresponding to this rotational angle. The focus drive controller 41 is able to receive signals from the focus ring angle detector 90, and able to send signals to the focus motor 64. The focus drive controller 41 sends the decision result to the lens microcomputer 40. The focus drive controller 41 drives the focus motor 64 on the basis of a control signal from the lens microcomputer 40. More precisely, the lens microcomputer 40 produces a drive signal for driving the focus motor 64 on the basis of a focus ring rotational angle signal. When the lead screw 64a of the focus motor 64 rotates according to the drive signal, the focus lens unit 75 moves in the Z axis direction via the rack 66 that meshes with the lead screw 64a. In the wide angle end state shown in FIGS. 5 and 6, the subject distance is infinity, but as the subject distance draws closer, the focus lens unit 75 moves to the Z axis direction positive side. Similarly, in the telephoto end state shown in FIGS. 7 and 8, the subject distance is infinity, but as the subject distance becomes shorter, the focus lens unit 75 moves to the Z axis direction positive side. The amount of movement of the focus lens unit 75 is greater in this case than in the case of the wide angle end.

In this way, the user can perform focusing by turning the focus ring 89 while looking at the subject on the display unit 20. In the manual focus imaging mode, when the user presses the shutter button 30 all the way down, imaging is performed in this unchanged state.

(4) Still Picture Capture

When the user presses the shutter button 30 all the way down, a command is sent from the body microcomputer 10 to the lens microcomputer 40 so that the aperture value of the optical system L will be set to the aperture value calculated on the basis of the light measurement output of the imaging sensor 11. The aperture drive controller 42 is controlled by the lens microcomputer 40, and the aperture unit 62 is constricted to the indicated aperture value. Simultaneously with the indication of the aperture value, a drive command is sent from the imaging sensor drive controller 12 to the imaging sensor 11, and a shutter unit 33 drive command is sent out. The imaging sensor 11 is exposed by the shutter unit 33 for a length of time corresponding to the shutter speed calculated on the basis of the light measurement output of the imaging sensor 11.

The body microcomputer 10 executes imaging processing and, when the imaging is completed, sends a command signal to the image recording controller 19. The image recorder 18 records an image signal to an internal memory and/or removable memory on the basis of the command of the image recording controller 19. The image recorder 18 records imaging mode information (whether auto-focus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the display unit 20.

Also, upon completion of the exposure, the shutter unit 33 is reset to its initial position by the body microcomputer 10. The body microcomputer 10 issues a command to the lens microcomputer 40 for the aperture drive controller 42 to reset the aperture unit 62 to its open position, and a reset command is sent from the lens microcomputer 40 to the various units. Upon completion of this resetting, the lens microcomputer 40 tells the body microcomputer 10 that resetting is complete. After the resetting completion information has been received from the lens microcomputer 40, and after a series of post-exposure processing has been completed, the body microcomputer 10 confirms that the shutter button 30 is not being pressed, and the imaging sequence is concluded.

(5) Moving Picture Capture

The digital camera 1 also has the function of capturing moving pictures. In moving picture imaging mode, image data is produced by the imaging sensor 11 at a specific period, and the image data thus produced is utilized to continuously carry out auto-focusing by contrast detection method. In moving picture imaging mode, if the shutter button 30 is pressed, or if the moving picture capture operation button 24 is pressed, a moving picture is recorded to the image recorder 18, and when the shutter button 30 or the moving picture capture operation button 24 is pressed again, recording of the moving picture by the image recorder 18 is stopped.

Features of Digital Camera

The features of the digital camera 1 described above are as follows.

(1)

With this digital camera 1, when viewed in the Z axis direction, the drive unit 70 is fixed to the second lens group unit 77 so that the first profile line 70L formed by the second lens group unit 77 and the drive unit 70 will be substantially circular, and this reduces how much the drive unit 70 sticks out from the second lens group unit 77. Consequently, the interchangeable lens unit 2 can be more compact.

(2)

The motor holder 64c of the drive unit 70 is fixed to the second holder 55 so as to face the third lens group G3. More precisely, since the motor holder 64c is disposed facing the optical axis AZ (the center of the third lens group G3), the profile of the second lens group unit 77 and the drive unit 70 can be made to be closer to circular.

In particular, with this digital camera 1, an imaginary line N that is perpendicular to the holder body 64e and intersects the rotational axis R1 overlaps the third lens group G3 when viewed in the Z axis direction. The imaginary line N also intersects the optical axis AZ. This configuration reduces how much the drive unit 70 sticks out from the profile of the second lens group unit 77, and allows the first profile line 70L formed by the second lens group unit 77 and the drive unit 70 to be closer to circular.

(3)

In a state in which the drive unit 70 is fixed to the second lens group unit 77, the rack body 66a opens substantially toward the circumferential direction, so the drive unit 70 and the rack 66 can be efficiently disposed on the outer peripheral side of the third lens group G3.

(4)

A rotational force is imparted by the torsion coil spring 68 to the rack 66 so that the rack body 66a will rotate in the A direction around the rotational axis R2. More precisely, a rotational force is imparted by the torsion coil spring 68 to the rack 66 so that the rack body 66a will move to the outside of the second holder 55. Accordingly, as shown in FIG. 17, in a state in which the drive unit 70 is not fixed to the second lens group unit 77, the rack body 66a rotates around the rotational axis R2 so as to face the outside of the second holder 55, and stops with respect to the second holder 55 and the third lens group support frame 56 in a state of being in contact with the first support 55a. Consequently, in attaching the drive unit 70 to the second holder 55, the lead screw 64a can be easily mated with the rack body 66a. This affords a smaller size and facilitates the work during assembly.

(5)

Since the drive unit 70, the rotational axis R2, and the guide pole 63a are disposed aligned in the circumferential direction, the drive unit 70 and the rack 66 can be efficiently disposed on the outer peripheral side of the third lens group G3, and the first profile line 70L can be made to be closer to circular.

Also, the lead screw 64a and the guide pole 63a are disposed aligned in the circumferential direction, and the rotational axis R1 and the center R3 are disposed on substantially the same circumference. Accordingly, the drive unit 70 and the guide pole 63a can be efficiently disposed on the outer peripheral side of the third lens group G3, while the lead screw 64a can be disposed close to the guide pole 63a. In other words, the interchangeable lens unit 2 can be made more compact, while good drive force transmission efficiency can be ensured.

(6)

Since the torsion coil spring 68 presses the rack 66 in the Z axis direction against the first rack support 56c, this suppresses movement of the rack 66 in the Z axis direction with respect to the third lens group support frame 56, and improves the positional accuracy of the focus lens unit 75 with respect to the second lens group unit 77. In other words, the accuracy of focal adjustment can be improved with the torsion coil spring 68.

In particular, the torsion coil spring 68, which imparts rotational force in the A direction to the rack 66, also improves the positional accuracy of the rack 66 with respect to the third lens group support frame 56. Accordingly, the single torsion coil spring 68 has the effect of both facilitating work during assembly and improving the accuracy of focal adjustment.

(7)

The first profile line 70L formed by the second lens group unit 77 and the drive unit 70 substantially follows the inner peripheral face SOL of the fixed frame 50 when viewed in the optical axis direction, so the layout of the members is more efficient and the interchangeable lens unit 2 can be more compact.

(8)

Since the terminals 64f of the drive unit 70 stick out substantially toward the circumferential direction, the terminals 64f are prevented from sticking out from the second profile line 77L of the second lens group unit 77. Consequently, the first profile line 70L formed by the second lens group unit 77 and the drive unit 70 can be made even closer to circular.

(9)

As shown in FIGS. 9 and 10, since the second lens group unit 77, the focus lens unit 75, and the drive unit 70 consist of a single assembly, confirmation of the operation of the focus lens unit 75, measurement of drive accuracy, and so forth can be carried out before the interchangeable lens unit 2 is in a completed state.

Consequently, the probability that drive error will occur in the focus lens unit 75 in the completed interchangeable lens unit 2 can be kept low, and the manufacturing efficiency can be increased for the interchangeable lens unit 2 and the digital camera 1.

(10)

Since the constitution described above allows the interchangeable lens unit 2 to be made more compact, the overall digital camera 1 can also be more compact.

Other Embodiments

Embodiments of the present invention are not limited to those given above, and various modifications and alterations are possible without departing from the gist of the present invention. Also, the embodiment given above is essentially a preferred example, and is not intended to limit the present invention, its applications, or its scope of application.

(1)

In the above embodiment, the digital camera was capable of capturing both still and moving pictures, but may instead be capable of capturing only still pictures, or only moving pictures.

(2)

The above-mentioned digital camera 1 may be, for example, a digital still camera, a digital video camera, a mobile telephone equipped with a camera, or a PDA equipped with a camera.

(3)

The above-mentioned digital camera 1 do not have a quick return mirror, but may have a quick return mirror as do conventional single reflex lens cameras.

(4)

The configuration of the optical system L is not limited to that in the embodiments. For example, the third lens group G3 may consist of a plurality of lenses, and the second lens group G2 may consist of a single lens.

(5)

In the above embodiment, the exposure time to the imaging sensor 11 was controlled by operating the shutter unit 33, but the exposure time of the imaging sensor 11 may instead be controlled by an electronic shutter.

(6)

In the above embodiment, electronic tracking was performed by the lens microcomputer 40, but a command may be sent from the body microcomputer 10 to the lens microcomputer 40, and the control of the electronic tracking may be performed on the basis of this command.

(7)

In the above embodiment, the first profile line 70L formed by the second lens group unit 77 and the drive unit 70 was substantially circular. The phrase "the first profile line 70L is substantially circular" here encompasses not only a case in which the first profile line 70L is completely circular, but also a case in which the first profile line 70L deviates from being circular to the extent that the interchangeable lens unit 2 size can still be reduced.

In determining whether or not the first profile line 70L is substantially circular, even if a portion is provided that sticks out to the outside, such as a cam pin, the shape of that portion is not taken into account. For instance, we do not take into account the shape of a portion that sticks out to the outside when viewed in a direction along the optical axis AZ and comes into contact with other members, such as the cam pin 82 or the protrusion 55b.

(8)

Figure 18:
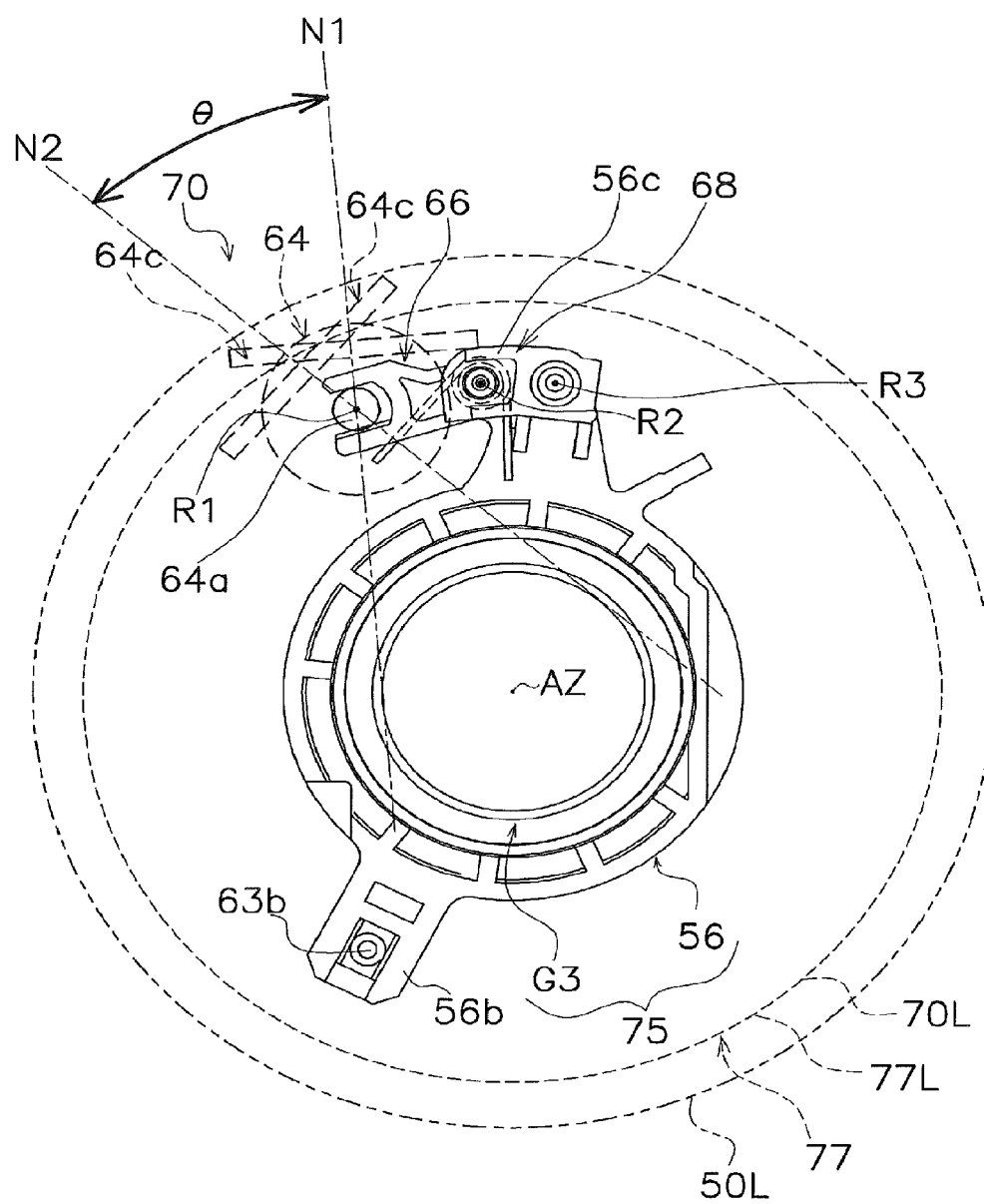
FIG. 18 is a plan view of the focus lens unit (another embodiment).

The angle at which the drive unit 70 is attached with respect to the second holder 55 is not limited to the attachment angle shown in FIG. 16, as long as the motor holder 64c faces toward the third lens group G3. For example, as shown in FIG. 18, as long as it is disposed within a range of from the imaginary line N1 to the imaginary line N2 when viewed in the Z axis direction (within a range of an attachment angle θ), the imaginary line N will overlap the third lens group G3, so the first profile line 70L can be kept substantially circular.

What is claimed is:

1. A lens barrel, comprising:
   a first lens unit including a first lens element and a first lens support frame supporting the first lens element;
   a second lens unit including a second lens element and a second lens support frame supporting the second lens element, and being supported by the first lens unit so as to be able to move in the optical axis direction of the first lens element with respect to the first lens unit; and
   a drive unit arranged to be used to drive the second lens unit with respect to the first lens unit, and fixed to the first lens unit, wherein
   the second lens unit includes a transmission member supported rotatably around a second rotational axis by the second lens support frame and arranged to convert the rotary motion of a drive shaft into linear motion in the optical axis direction, and an elastic member arranged to impart rotational force around the second rotational axis to the transmission member so that the transmission member moves to the outer peripheral side with respect to the second lens support frame,
   the transmission member includes a transmission member body having an approximate U shape that opens on the opposite side from the second rotational axis, and transmits drive force from the drive unit, and
   the transmission member body opens toward the approximate circumferential direction in a state in which the drive unit is fixed to the first lens unit.

\* \* \* \* \*